US012571755B2

(12) United States Patent
Berduque et al.

(10) Patent No.: US 12,571,755 B2
(45) Date of Patent: Mar. 10, 2026

(54) REFERENCE ELECTRODES OF ELECTROCHEMICAL SENSORS

(71) Applicant: Analog Devices International Unlimited Company, Limerick (IE)

(72) Inventors: Alfonso Berduque, Crusheen (IE); David Bolognia, Charlestown, MA (US); William Hanly, Kilteely (IE); Richard Doyle, Churchtown (IE); Louise M. McGrath, Mallow (IE); Julie Byard, Huntingdon (GB); Alan J. O'Donnell, Castletroy (IE)

(73) Assignee: Analog Devices International Unlimited Company, Limerick (IE)

( * ) Notice: Subject to any disclaimer, the term of this patent is extended or adjusted under 35 U.S.C. 154(b) by 308 days.

(21) Appl. No.: 18/187,466

(22) Filed: Mar. 21, 2023

(65) Prior Publication Data

US 2023/0304958 A1     Sep. 28, 2023

Related U.S. Application Data

(60) Provisional application No. 63/322,369, filed on Mar. 22, 2022.

(51) Int. Cl.
*G01N 27/30*          (2006.01)
*G01N 27/327*          (2006.01)

(52) U.S. Cl.
CPC ....... *G01N 27/301* (2013.01); *G01N 27/3272* (2013.01)

(58) Field of Classification Search
CPC .......................... G01N 27/301; G01N 27/3272
See application file for complete search history.

(56) References Cited

U.S. PATENT DOCUMENTS

| | | | |
|---|---|---|---|
| 3,675,501 A | 7/1972 | De Kanter | |
| 4,267,509 A | 5/1981 | Graham | |

(Continued)

FOREIGN PATENT DOCUMENTS

| | | | |
|---|---|---|---|
| AT | 511 171 A1 | 9/2012 | |
| DE | 4131927 A1 | 4/1993 | |

(Continued)

OTHER PUBLICATIONS

EPO machine-generated English language translation of DE 4131927 A1, patent published Apr. 8, 1993 (Year: 1993).*

(Continued)

*Primary Examiner* — Alexander S Noguerola
(74) *Attorney, Agent, or Firm* — ArentFox Schiff LLP

(57)          ABSTRACT

A reference electrode of an electrochemical sensor includes a substrate having internal walls defining a well and a channel. The reference electrode includes a conductive element disposed in the substrate. The well extends from a first surface of a substrate towards a second surface of the substrate. The channel is within the substrate. The channel has a first end connected to the well and a second end that is in contact with the conductive element. The reference electrode may include an additional well that extends from the first surface towards the second surface. The additional well may be connected to the second end of the channel and may be in contact with the conductive element. The channel and the wells form a flow path of a conductive medium. The flow path may be coupled to an agitating element or heating element that promotes flow of the conductive medium.

19 Claims, 22 Drawing Sheets

(56) References Cited

U.S. PATENT DOCUMENTS

| | | | |
|---|---|---|---|
| 4,714,527 A | 12/1987 | Hofmeier et al. | |
| 4,734,184 A | 3/1988 | Burleigh et al. | |
| 5,338,435 A | 8/1994 | Betts et al. | |
| 6,030,118 A | 2/2000 | Schneider et al. | |
| 6,663,756 B2 * | 12/2003 | Lee .................... | G01N 27/4035 |
| | | | 204/290.14 |
| 7,048,890 B2 | 5/2006 | Coehoorn et al. | |
| 7,547,415 B2 | 6/2009 | Hataoka et al. | |
| 10,357,771 B2 | 7/2019 | Bharadwaj et al. | |
| 11,525,820 B2 | 12/2022 | Meier et al. | |
| 11,603,254 B1 | 3/2023 | Forouzandeh et al. | |
| 11,666,913 B2 | 6/2023 | Beaumont et al. | |
| 11,788,646 B1 | 10/2023 | Huff | |
| 2002/0023684 A1 | 2/2002 | Chow | |
| 2003/0000833 A1 | 1/2003 | Mansouri et al. | |
| 2003/0080442 A1 | 5/2003 | Unger | |
| 2003/0214304 A1 | 11/2003 | Karinka et al. | |
| 2004/0188252 A1 | 9/2004 | Chan et al. | |
| 2006/0017030 A1 | 1/2006 | Koeneman | |
| 2009/0026080 A1 | 1/2009 | Han et al. | |
| 2009/0060789 A1 | 3/2009 | Aas et al. | |
| 2009/0291507 A1 | 11/2009 | Clemmens et al. | |
| 2011/0192720 A1 | 8/2011 | Blauw et al. | |
| 2012/0079981 A1 | 4/2012 | Huffman et al. | |
| 2013/0085687 A1 | 4/2013 | Danov et al. | |
| 2013/0105581 A1 | 5/2013 | Kwon et al. | |
| 2014/0183059 A1 | 7/2014 | Whitesides et al. | |
| 2016/0033438 A1 | 2/2016 | Lan et al. | |
| 2017/0045507 A1 | 2/2017 | Khattak et al. | |
| 2017/0363609 A1 | 12/2017 | Tabard-Cossa et al. | |
| 2018/0038737 A1 | 2/2018 | Hedlund et al. | |
| 2019/0094178 A1 | 3/2019 | Delamarche et al. | |
| 2021/0300751 A1 | 9/2021 | Kuells et al. | |
| 2021/0325484 A1 | 10/2021 | Pellegrino et al. | |
| 2022/0212187 A1 | 7/2022 | Samproni | |
| 2022/0362778 A1 | 11/2022 | Foster et al. | |
| 2022/0371019 A1 | 11/2022 | Mei et al. | |
| 2023/0085052 A1 | 3/2023 | Klein et al. | |

FOREIGN PATENT DOCUMENTS

| | | | |
|---|---|---|---|
| EP | 3 896 470 A1 | 10/2021 | |
| JP | 2003-220322 A | 8/2003 | |
| JP | 2005-169219 A | 6/2005 | |
| JP | 2005525568 A | 8/2005 | |
| JP | 2006-300860 A | 11/2006 | |
| JP | 2009-528515 A | 8/2009 | |
| JP | 2010085334 A | 4/2010 | |
| JP | 2014006086 A | 1/2014 | |
| JP | 2011522219 A | 3/2018 | |
| JP | 2018508745 A | 3/2018 | |
| JP | 2018-528407 A | 9/2018 | |
| WO | 2011142636 A2 | 11/2011 | |
| WO | 2017165535 A1 | 9/2017 | |

OTHER PUBLICATIONS

EPO machine-generated English language translation of JP 2010085334 A, patent published Apr. 15, 2010 (Year: 2010).*

EPO machine-generated English language translation of WO 2011142636 A2 A, patent published Nov. 17, 2011 (Year: 2011).*

G.C. Biswas, et al., "Autonomous Microfluidics Realized With Active Hydrophobic Valves", Transducers 2015, Anchorage, Alaska, USA, Jun. 21-25, 2015, pp. 1806-1809.

M. Annabestani, et al., "Ionic Electro Active Polymer-Based Soft Actuators and Their Applications in Microfluidic Micropumps, Microvalves, and Micromixers: A Review", pp. 1-32.

Edwin W.H. Jager, et al., Electroactive Surfaces Based On Conducting Polymers for Controlling Cell Adhesion, Signaling, and Proliferation, Transducers 2009, Denver, CO, USA, Jun. 21-25, 2009, pp. 1778-1781.

Philippe Dubois, et al., "Microactuators Based on Ion-Implanted Dielectric Electroactive Polymer Membrances (EAP)", The 13th International Conference on Solid-State Sensors, Actuators and Microsystems, Seoul, Korea, Jun. 5-9, 2005, pp. 2048-2051.

G. Londe, et al., "A Passive Microfluidic Valve Using Superhydrophobic/ Hydrophilic Nanostructures for Lab-On-A-Chip (LOC) Systems", The 14th International Conference on Solid-State Sensors, Actuators and Microsystems, Lyon, France, Jun. 10-14, 2007, pp. 1801-1804.

W. Iwasaki, et al., "Development of a Thermoresponsive Valve Membrane for Microfluic Paper-Based Analytical Device", Transducers 2019, Eurosensors XXXIII, Berlin, Germany, Jun. 23-27, 2019, pp. 2302-2305.

Y. Lee, et al., "Flow Characteristics of Hydrophilic/Hydrophobic Capillaries Considering Surface Tension", 2nd Annual International IEEE-EMBS Special Topic Conference on Microtechnologies in Medicine & Biology, May 2-4, 2002, Madison, Wisconsin USA, pp. 561-564.

T. Zhang, et al., "Microfluidic Valves Based on TiO2 Coating With Tunablebetween Super Hydrophilic and Super Hydrophobic", Transducers' 11, Beijing, pp. 306-309.

International Search Report and Written Opinion in PCT/EP2023/ 057254, mailed Aug. 24, 2023, 23 pages.

Lin et al., "Integrating solid-state sensor and microfluidic devices for glucose, urea and creatinine detection based on enzyme-carrying alginate microbeads," Biosensors and Bioelectronics, 2013, vol. 43, pp. 328-335.

Mohammadzadeh Alaiakbar et al: "Rapid and Inexpensive Method for Fabrication and Integration of Electrodes in Microfluidic Devices", Journal of Microelectromechanical Systems, IEEE, US, vol. 28, No. 4, Jul. 31, 2019 (Jul. 31, 2019), pp. 597-605, XP011737651, ISSN: 1057-7157, DOI: 10.1109/JEMS.2019.2914110.

International Search Report and Written Opinion in PCT/EP2023/ 057253, mailed Sep. 5, 2023, 24 pages.

International Search Report and Written Opinion in PCT/EP2023/ 057255, mailed Jun. 23, 2023, 16 pages.

Darwin R. Reyes et al: "Micro Total Analysis Systems. 1. Introduction, Theory, and Technology", Analytical Chemistry, ACS, US, vol. 74, No. 12, May 17, 2002 (May 17, 2002), pp. 2623-2636, XP055008417, ISSN: 0003-2700, DOI: 20.1021/ac0202435 abstract, p. 2624, left-hand column, p. 2624, right-hand column, last paragraph— 2625, left-hand column, paragraph 1 p. 2628, left-hand column.

Dissanayake et al., "Radio Frequency Controlled Microvalve for Biomedical Applications", Smart Materials IV, Proceedings of SPIE—The International Society for Optical Engineering, vol. 6413, Dec. 2006, pp. 64130D-1-64130D-13.

Fanavoll et al., "A Microfluidic Electrochemical Cell with Integrated PdH Reference Electrode for High Current Experiments", Electrochimica Acta, vol. 225, Jan. 2017, pp. 69-77.

Higuchi, et al., Valve-actuator-integrated reference electrode for an ultra-long-life Rumen pH sensor, Sensors 2020, 20, 1249 (Year 2020).

* cited by examiner

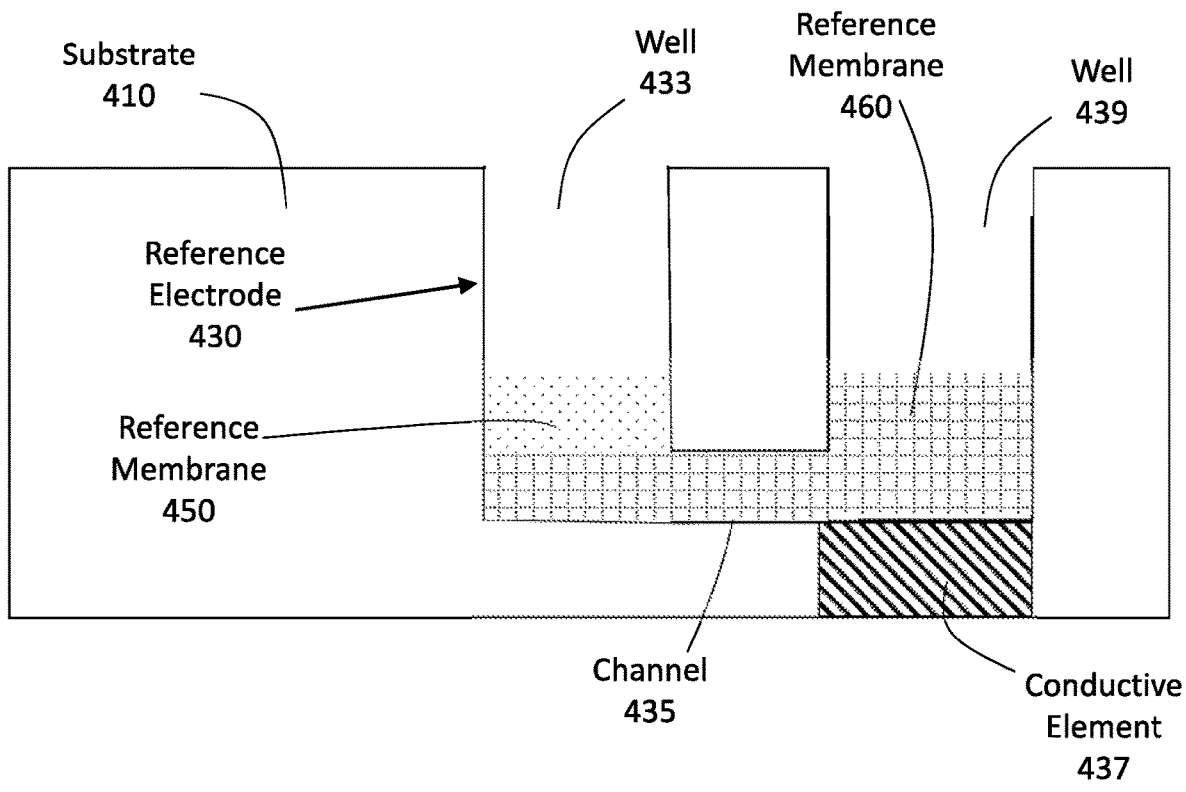
FIG. 4D

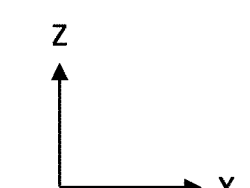
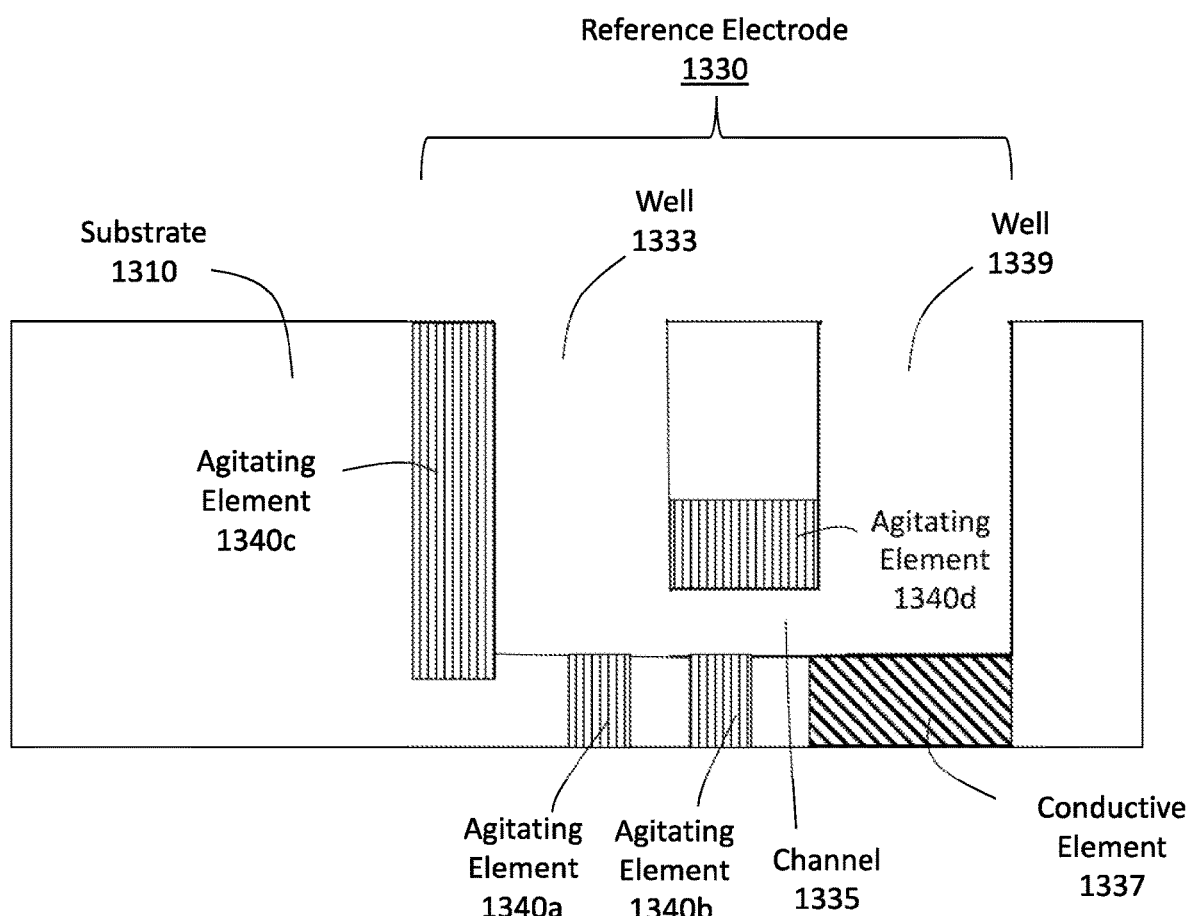
FIG. 13

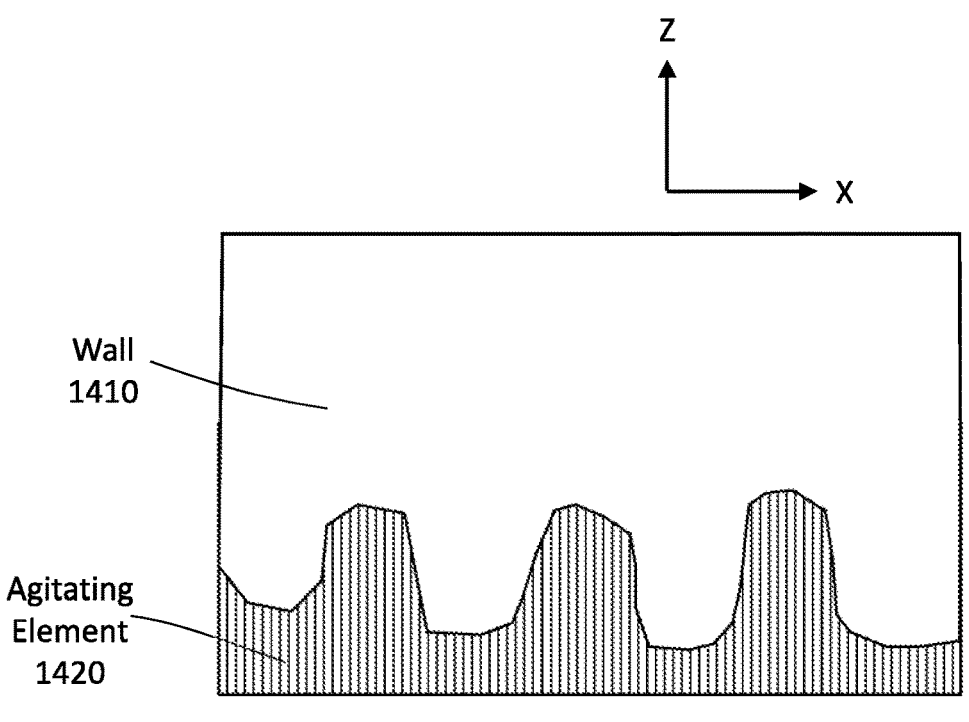
FIG. 14
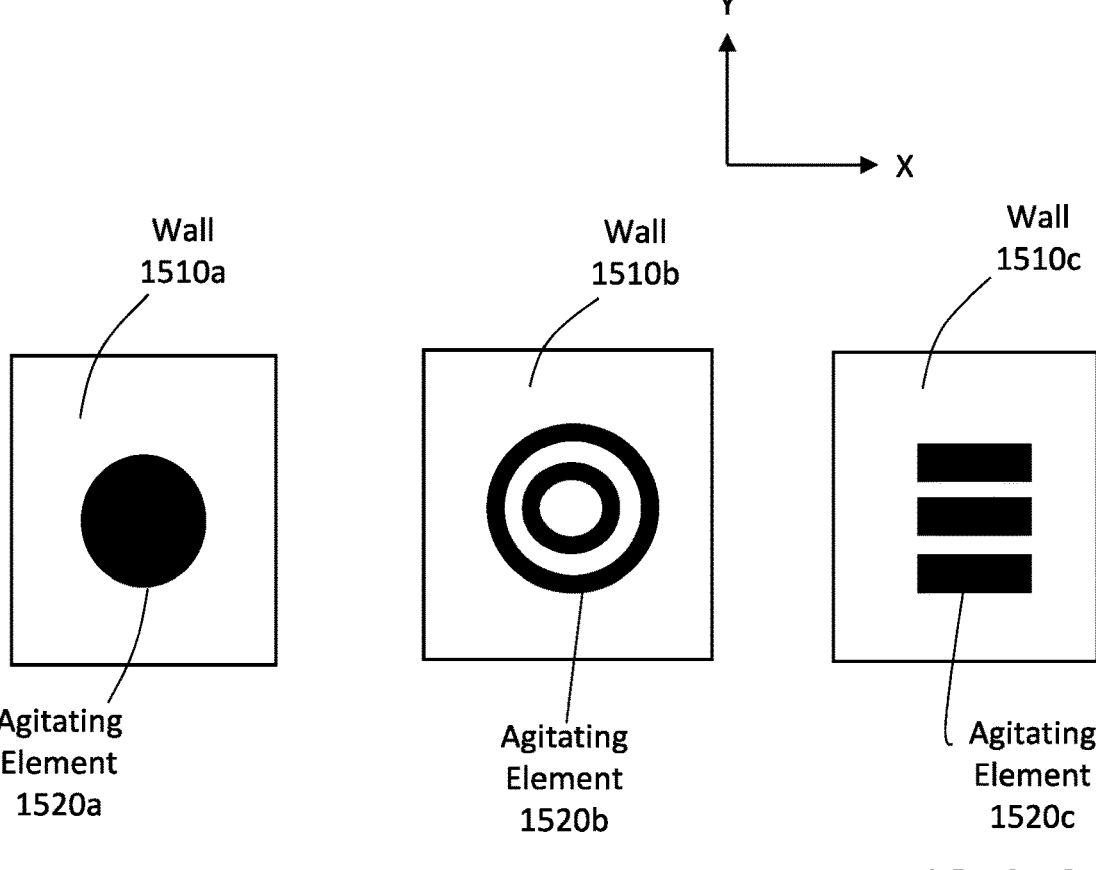
FIG. 15A        FIG. 15B        FIG. 15C

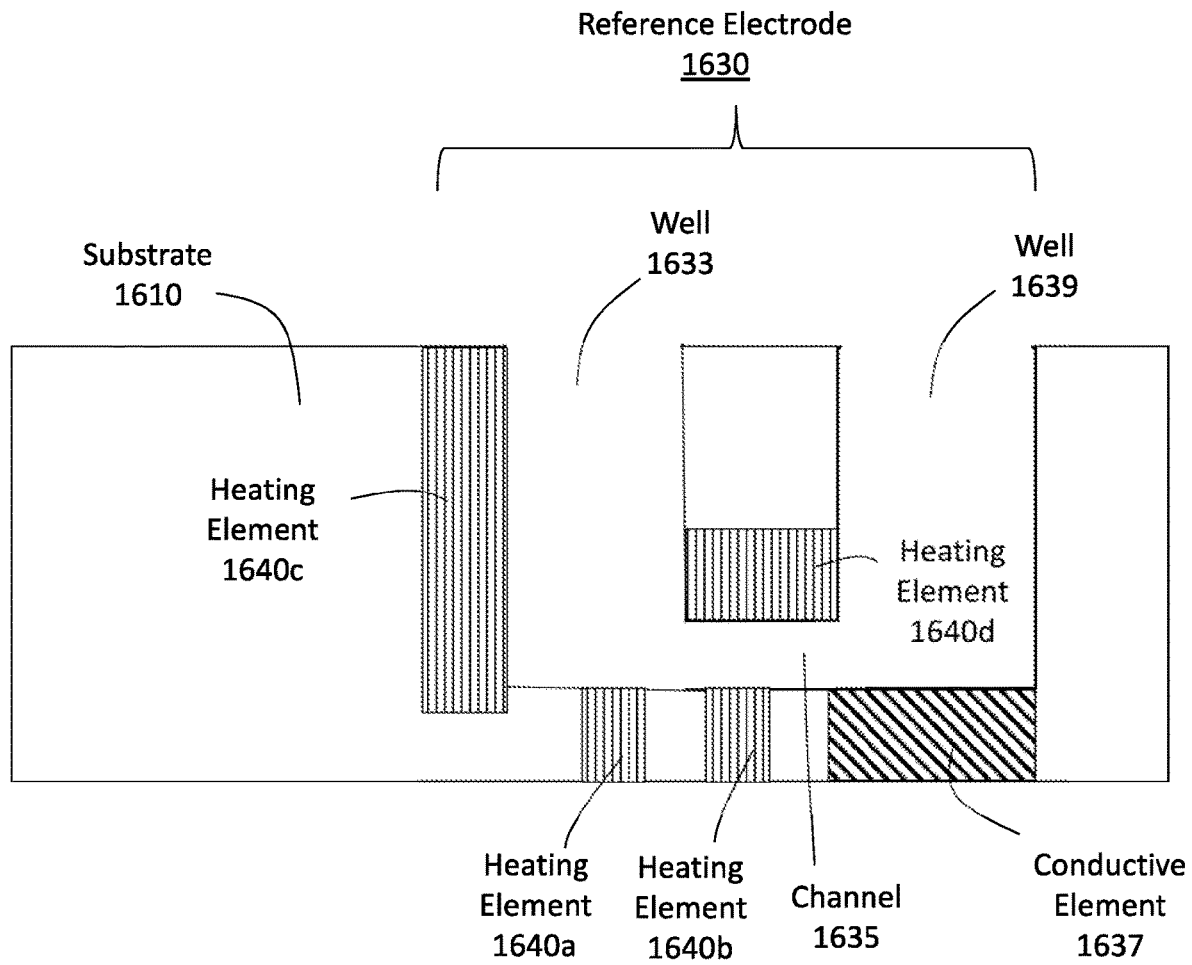
FIG. 16

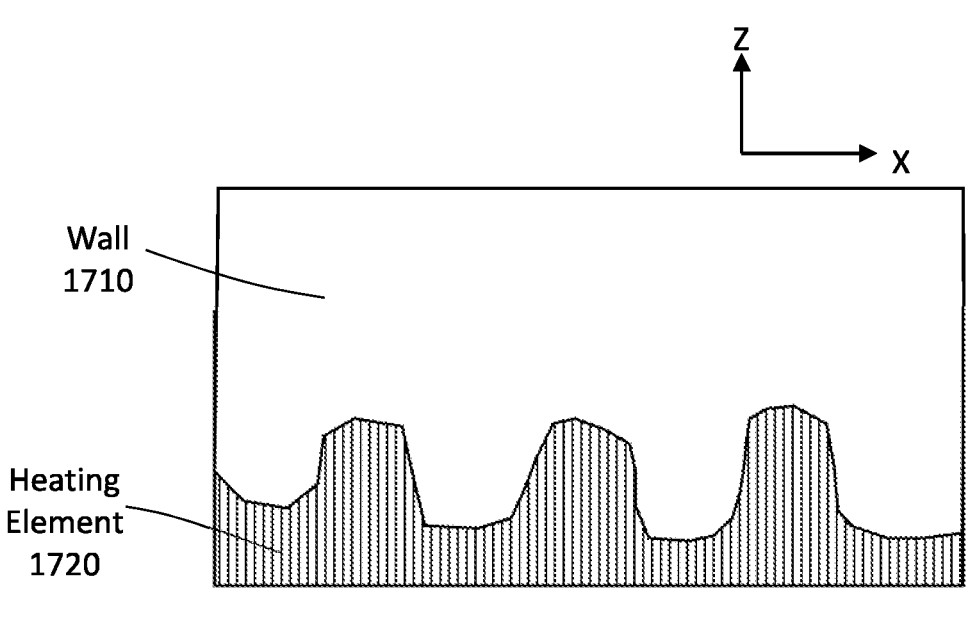
FIG. 17
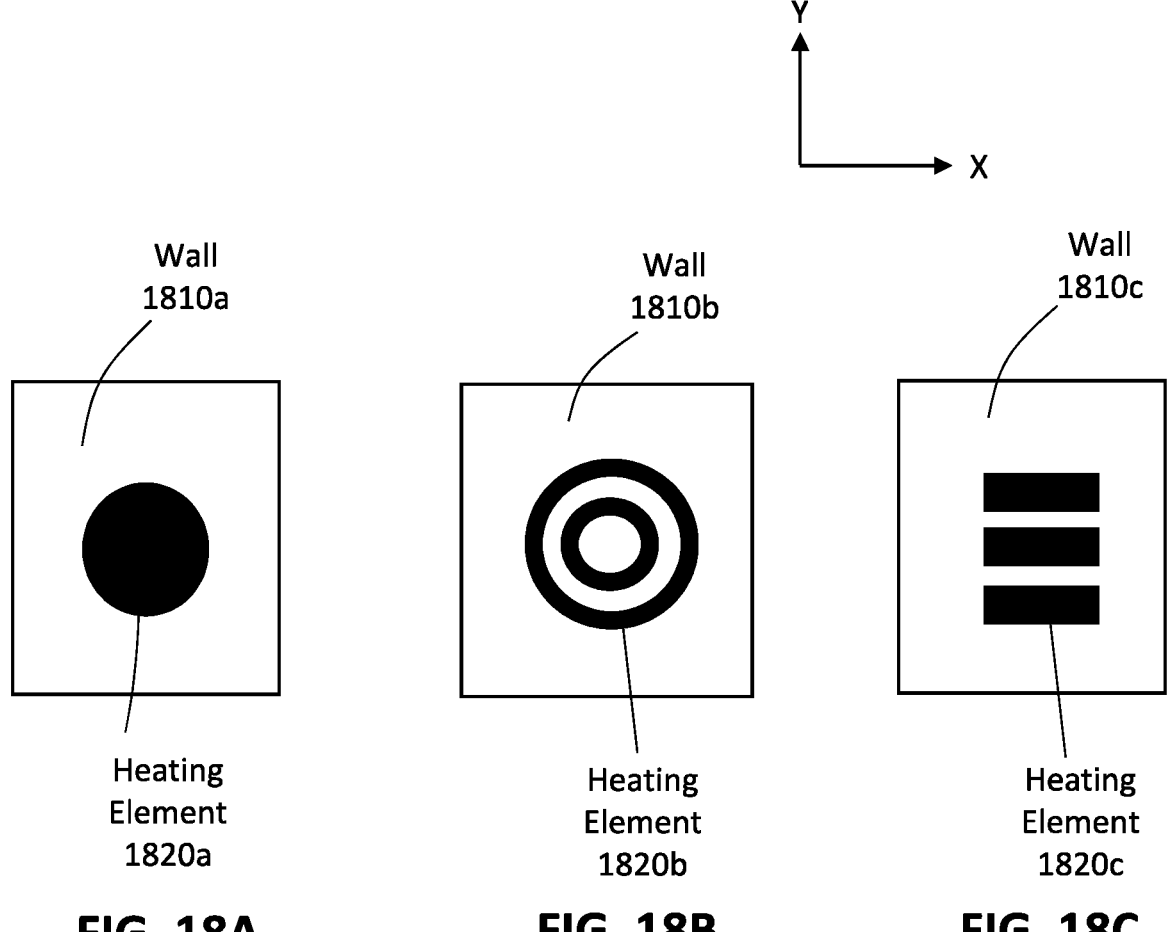
FIG. 18A          FIG. 18B          FIG. 18C

Reference Electrode
2100

REFERENCE ELECTRODES OF ELECTROCHEMICAL SENSORS

CROSS-REFERENCE TO RELATED APPLICATIONS

This application claims priority to U.S. Provisional Application No. 63/322,369 titled "REFERENCE ELECTRODES OF ELECTROCHEMICAL SENSORS" and filed Mar. 22, 2022, which is assigned to the assignee hereof and incorporated herein by reference.

TECHNICAL FIELD OF THE DISCLOSURE

The present disclosure relates generally to electrochemical sensors and, more specifically, to reference electrodes of electrochemical sensors.

BACKGROUND

Electrochemical sensors are a class of chemical sensors in which an electrode is used as a transducer element in the presence of an analyte. An electrochemical sensor may convert information associated with electrochemical reactions (e.g., the reaction between an electrode and an analyte) into an applicable qualitative or quantitative signal. Electrochemical sensors can produce electronic outputs in digital signals for further analysis.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a reference electrode in an electrochemical sensor, the reference electrode including: a substrate including: a first inner wall defining a first well in the substrate, the first well extending from a first surface of the substrate towards a second surface of the substrate, wherein the first surface is opposite the second surface; a second inner wall defining a second well in the substrate, the second well extending from the first surface towards the second surface; an electrically conductive element exposed to the second well; and a third inner wall defining a channel arranged between the first surface and the second surface, wherein a first end of the channel is connected to the first well, a second end of the channel is connected to the second well, and the first end is opposite the second end.

In some aspects, the techniques described herein relate to a reference electrode, wherein a first end of the second well is on the first surface, a second end of the second well is between the first surface and the second surface, and the electrically conductive element is between the second end and the second surface.

In some aspects, the techniques described herein relate to a reference electrode, wherein the electrically conductive element is configured to be in contact with a reference conductive medium, and the first well, the channel, or the second well are configured to be at least partially filled with the reference conductive medium.

In some aspects, the techniques described herein relate to a reference electrode, wherein the reference conductive medium is a solid or semi-solid membrane, or a liquid.

In some aspects, the techniques described herein relate to a reference electrode, the substrate further including: a fourth inner wall defining a third well in the substrate, the third well extending from the first surface towards the second surface; an additional electrical conductive element arranged in the third well; and a fifth inner wall defining an additional channel arranged between the first surface and the second surface, wherein a first end of the additional channel is connected to the first well, a second end of the additional channel is connected to the third well, and the first end of the additional channel is opposite the second end of the additional channel.

In some aspects, the techniques described herein relate to a reference electrode, further including: a valve coupled to the channel and configured to control flow of a conductive medium through the channel; and an additional valve coupled to the additional channel and configured to control flow of the conductive medium through the additional channel.

In some aspects, the techniques described herein relate to a reference electrode, wherein the electrical conductive element is configured to be used for wireless communication, and the additional electrical conductive element is configured to be used for wire communication.

In some aspects, the techniques described herein relate to a reference electrode, the substrate further including: a fourth inner wall defining an additional channel arranged between the first surface and the second surface, wherein a first end of the additional channel is connected to the first well, a second end of the additional channel is connected to the second well, and the first end of the additional channel is opposite the second end of the additional channel.

In some aspects, the techniques described herein relate to a reference electrode, further including: an agitating element arranged on a wall of the first well or the channel, wherein the agitating element is configured to agitate a flow of a material in the first well or the channel; or a heating element arranged on a wall of the first well or the channel, wherein the heating element is configured to increase a temperature of a material in the first well or the channel.

In some aspects, the techniques described herein relate to a reference electrode, wherein the first well is configured to be in contact with a test sample provided to the electrochemical sensor.

In some aspects, the techniques described herein relate to a reference electrode, wherein an opening of the second well is covered by a cap, and the cap is over the substrate.

In some aspects, the techniques described herein relate to a reference electrode in an electrochemical sensor, the reference electrode including: a substrate including: a first inner wall defining a well in the substrate, the well extending from a first surface of the substrate towards a second surface of the substrate, wherein the first surface is opposite the second surface; an electrically conductive element arranged in the substrate and between the first surface and the second surface; and a second inner wall defining a channel arranged in the substrate and between the first surface and the second surface, wherein a first end of the channel is connected to the well, the electrically conductive element is exposed to a second end of the channel, and the first end is opposite the second end.

In some aspects, the techniques described herein relate to a reference electrode, wherein a first end of the well is on the first surface, a second end of the well is between the first surface and the second surface, the first end of the channel is connected to the second end of the well, and the electrically conductive element is between the channel and the second surface.

In some aspects, the techniques described herein relate to a reference electrode, wherein at least one of the well or the channel is configured to be at least partially filled with a reference conductive medium, and the electrically conductive element is configured to be in contact with the reference conductive medium.

In some aspects, the techniques described herein relate to a reference electrode, further including: an agitating element arranged on a wall of the well or the channel, wherein the agitating element is configured to agitate a flow of a material in the well or the channel.

In some aspects, the techniques described herein relate to a reference electrode, further including: a heating element arranged on a wall of the well or the channel, wherein the heating element is configured to increase a temperature of a material in the well or the channel.

In some aspects, the techniques described herein relate to an electrochemical sensor, including: one or more working electrodes in a substrate; and a reference electrode electrically coupled to the one or more working electrodes, the reference electrode including: a first inner wall defining a well in the substrate, the well extending from a first surface of the substrate towards a second surface of the substrate, wherein the first surface is opposite the second surface, an electrically conductive element arranged in the substrate and between the first surface and the second surface, and a second inner wall defining a channel arranged in the substrate and between the first surface and the second surface, wherein a first end of the channel is connected to the well, the electrically conductive element is exposed to a second end of the channel, and the first end is opposite the second end.

In some aspects, the techniques described herein relate to an electrochemical sensor, wherein a working electrode of the one or more working electrodes includes a working well configured to be at least partially filled with an ion selective membrane, and the well is configured to be at least partially filled with a reference membrane that is different from the ion selective membrane.

In some aspects, the techniques described herein relate to an electrochemical sensor, wherein the one or more working electrodes includes a first working electrode and a second working electrode, and the well is between the first working electrode and the second working electrode.

In some aspects, the techniques described herein relate to an electrochemical sensor, wherein the channel extends in a direction that is not parallel to a direction along which the first working electrode and the second working electrode are arranged.

In some aspects, the techniques described herein relate to an electrochemical sensor, further including a counter electrode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To provide a more complete understanding of the present disclosure and features and advantages thereof, reference

Figure 1:
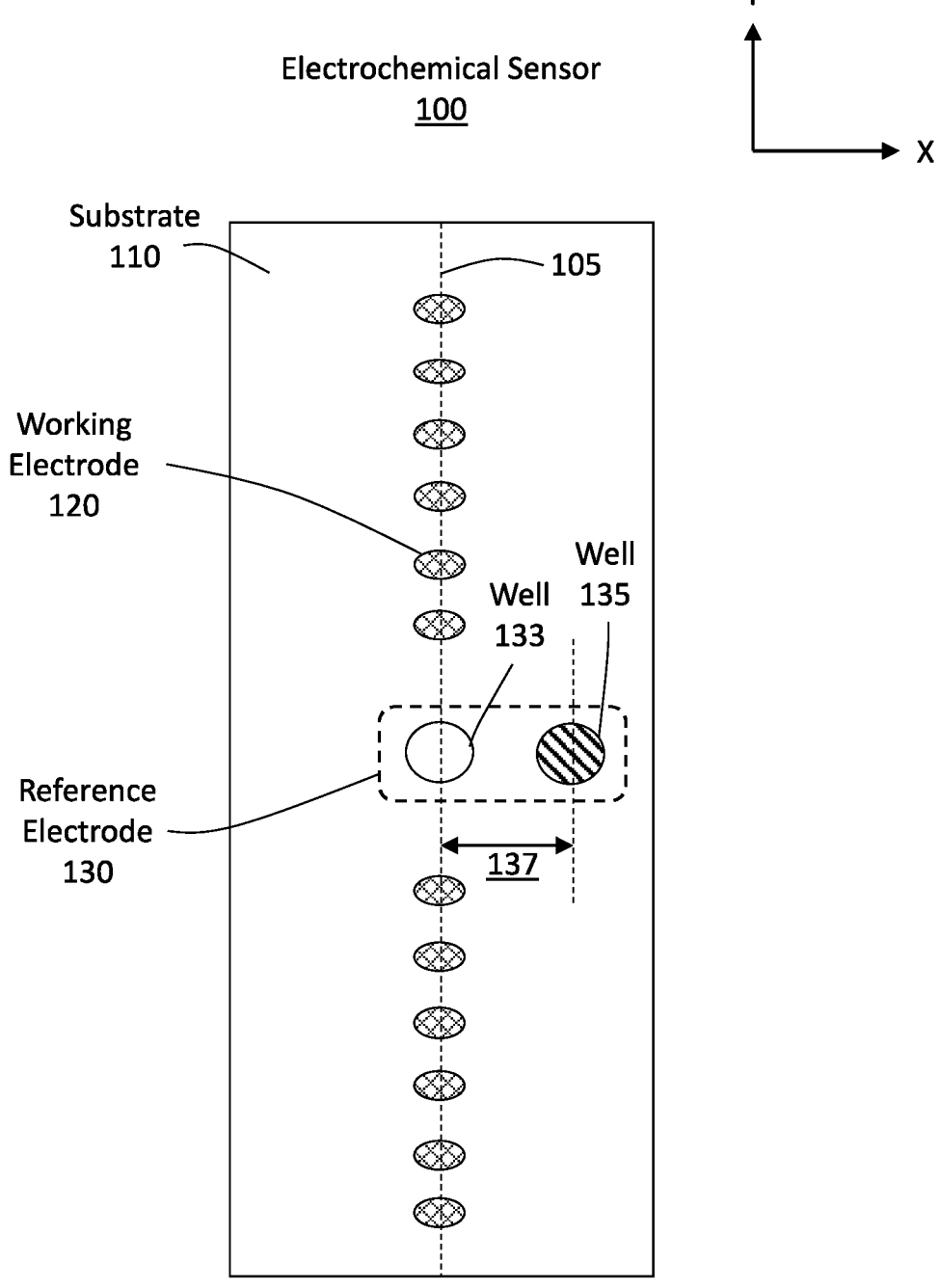
Figure 2A:
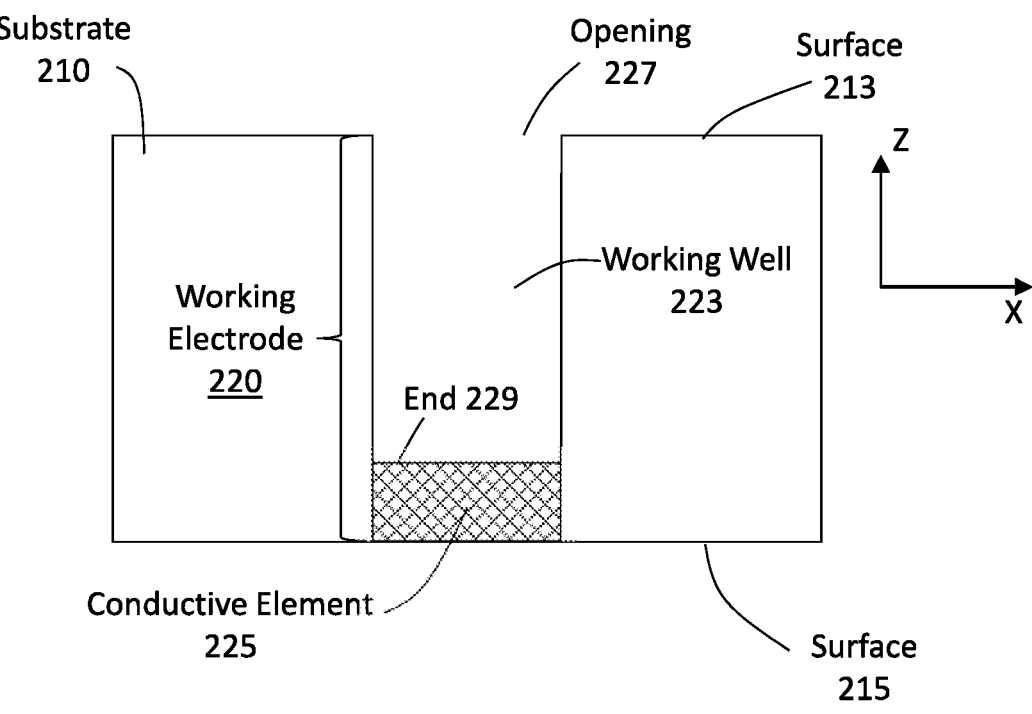
Figure 2B:
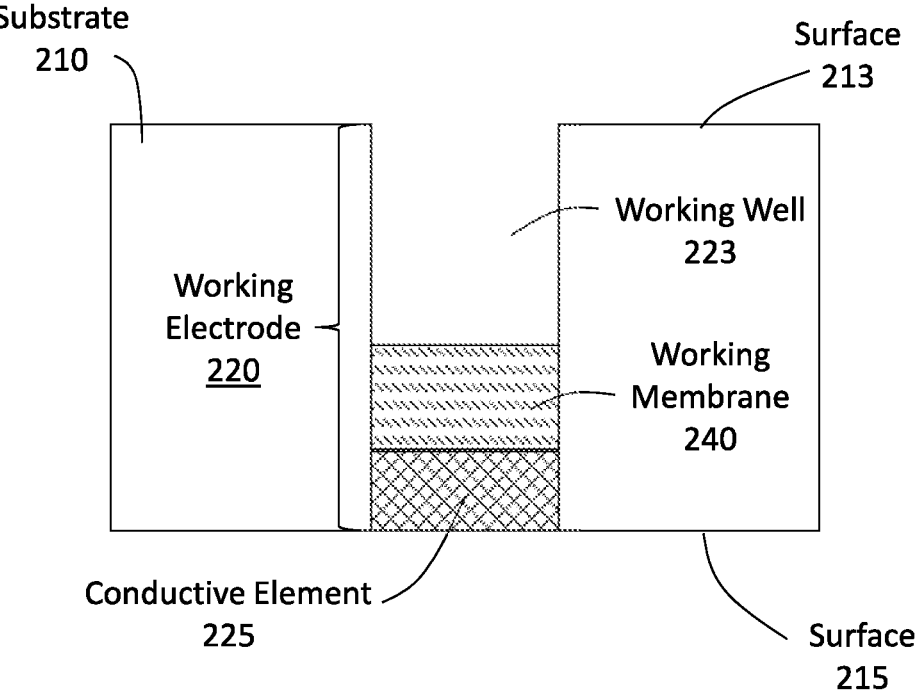
Figure 3A:
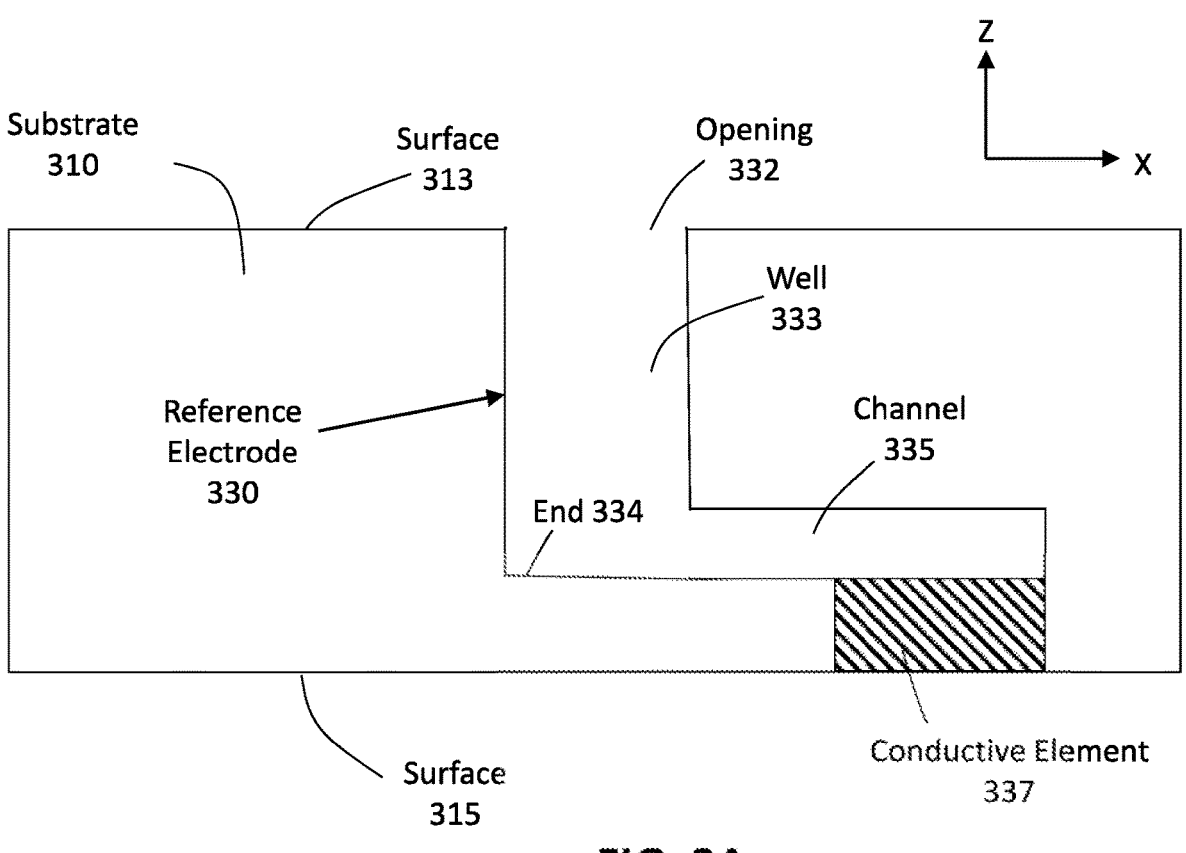
Figure 3B:
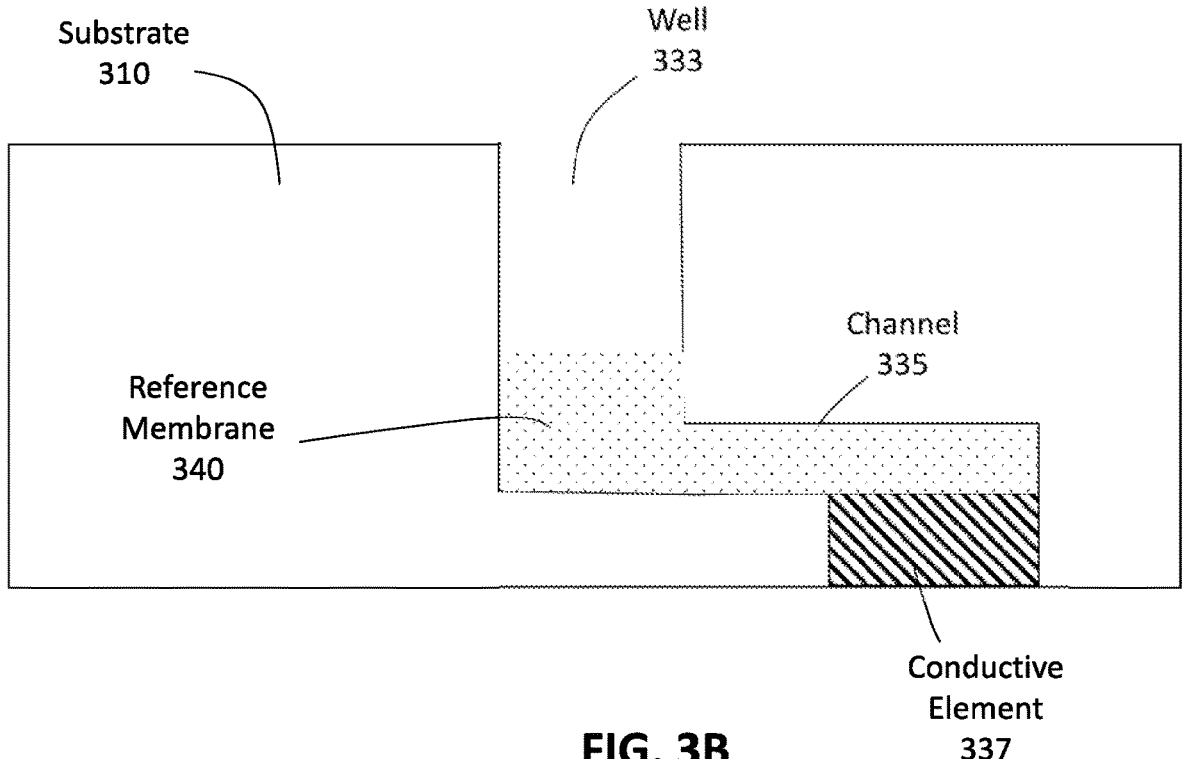
Figure 5:
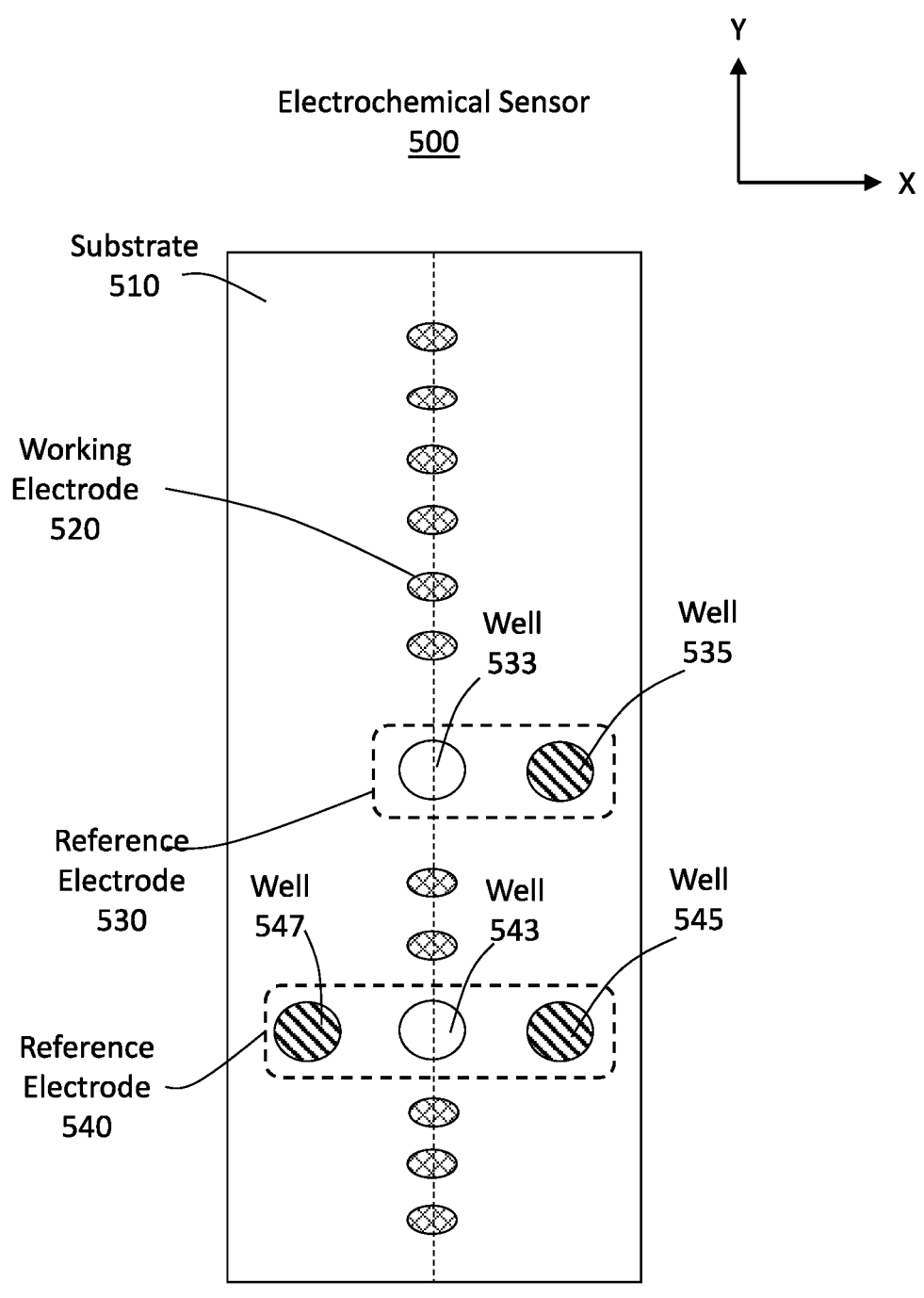
Figure 6:
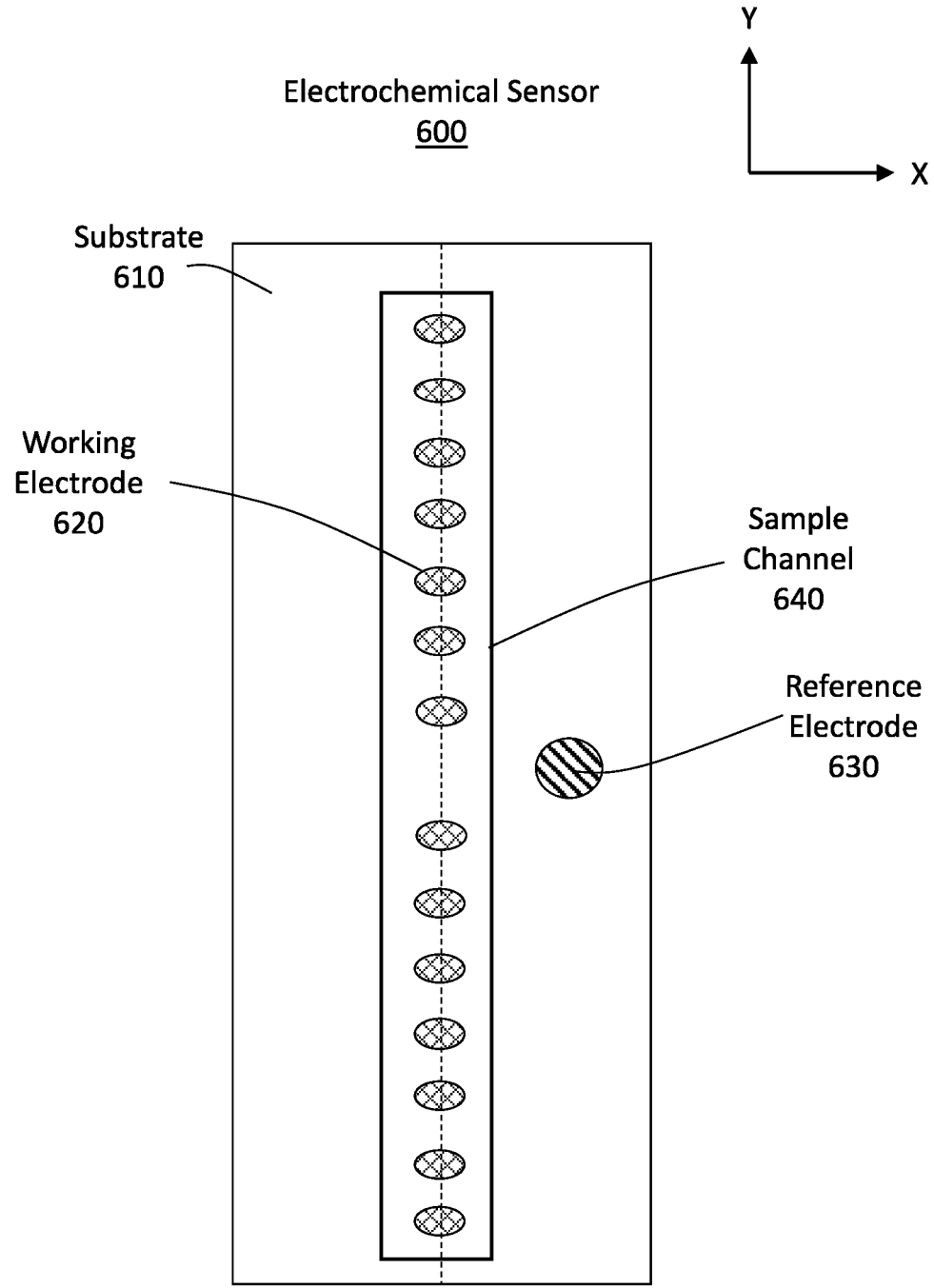
Figure 7:
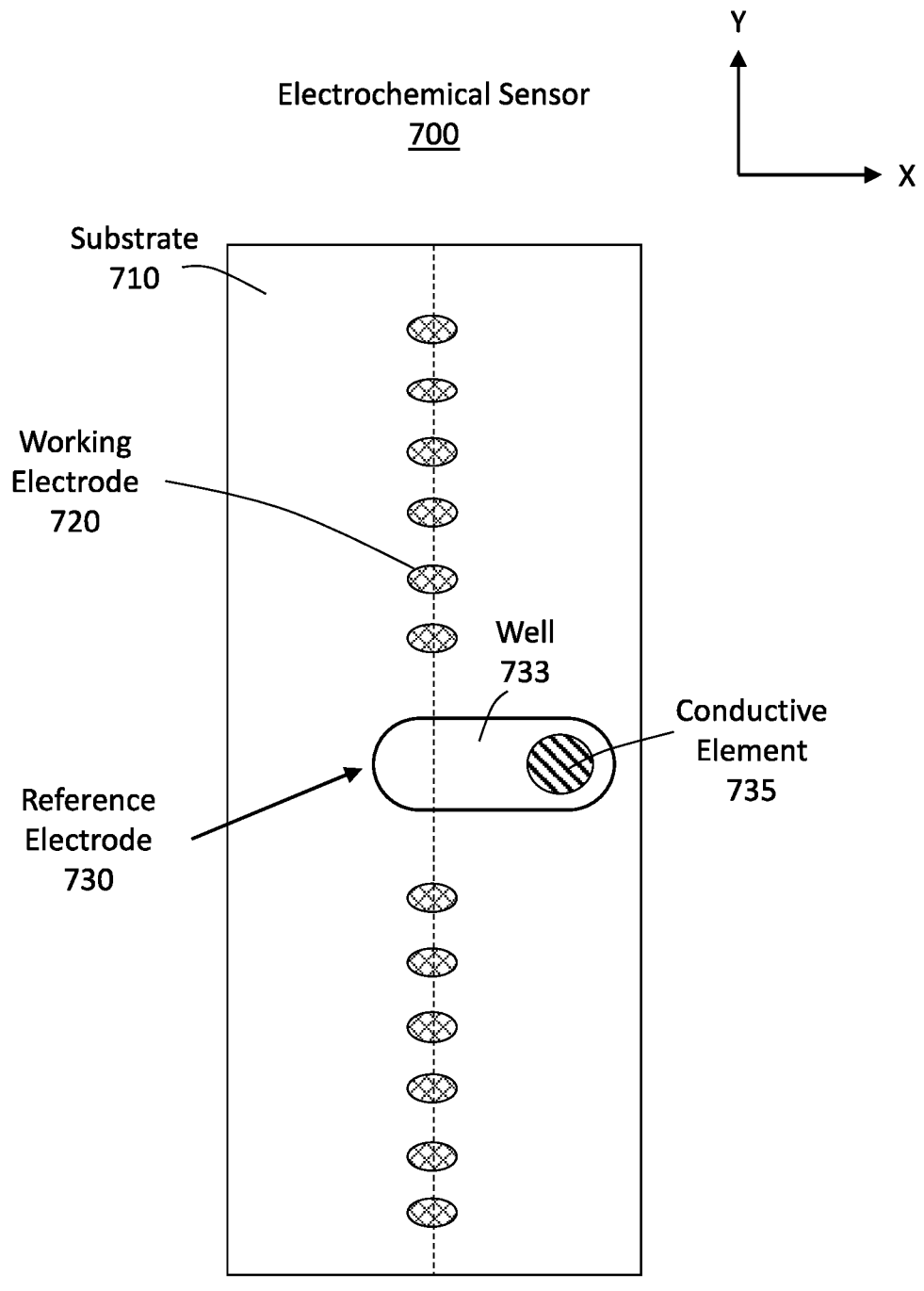
Figure 8A:
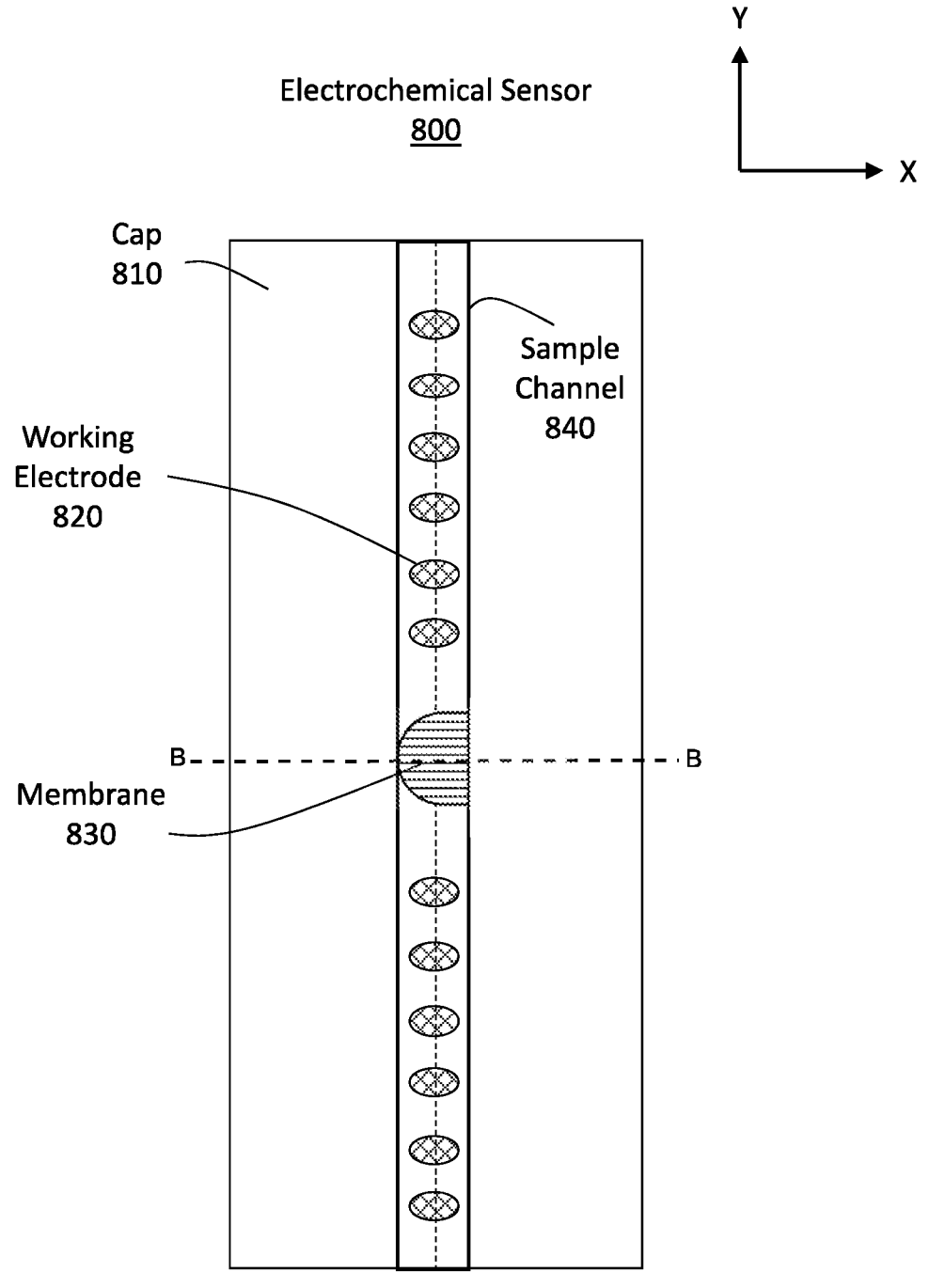
Figure 8B:
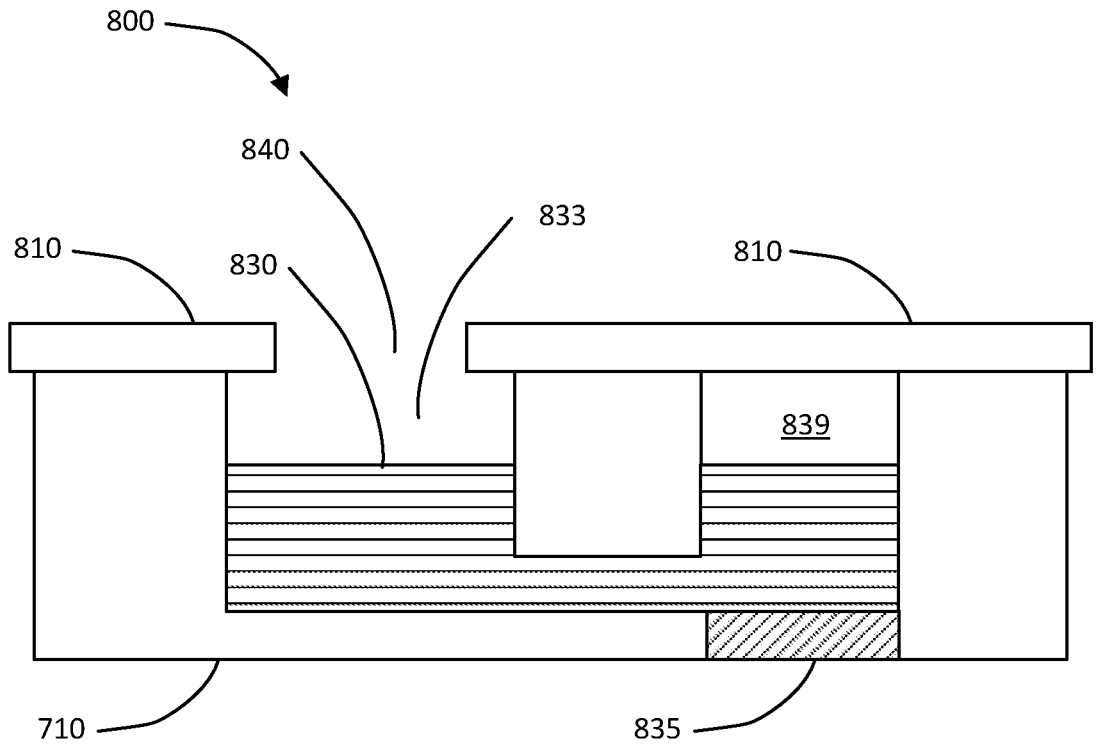
Figure 9:
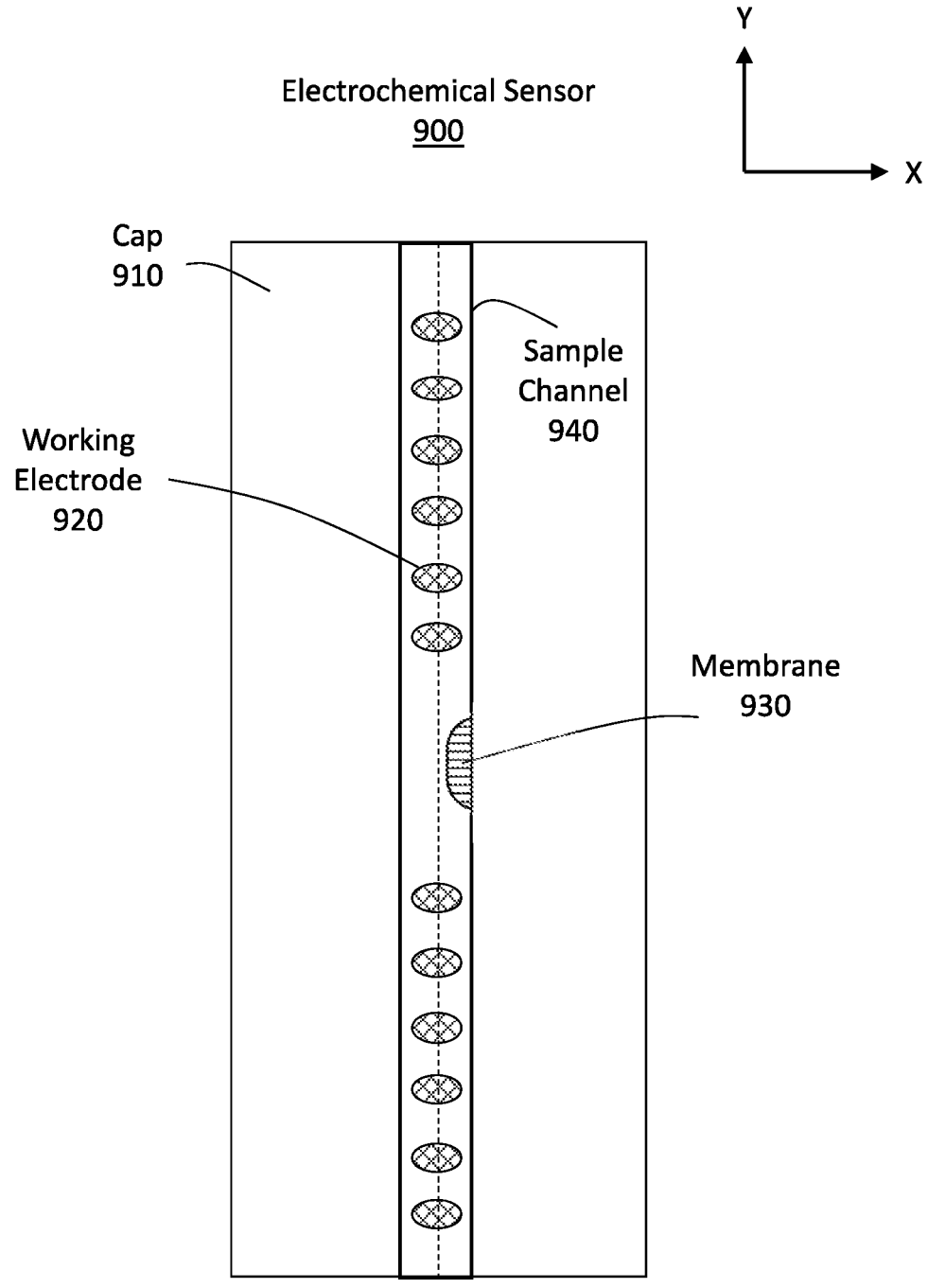
Figure 10:
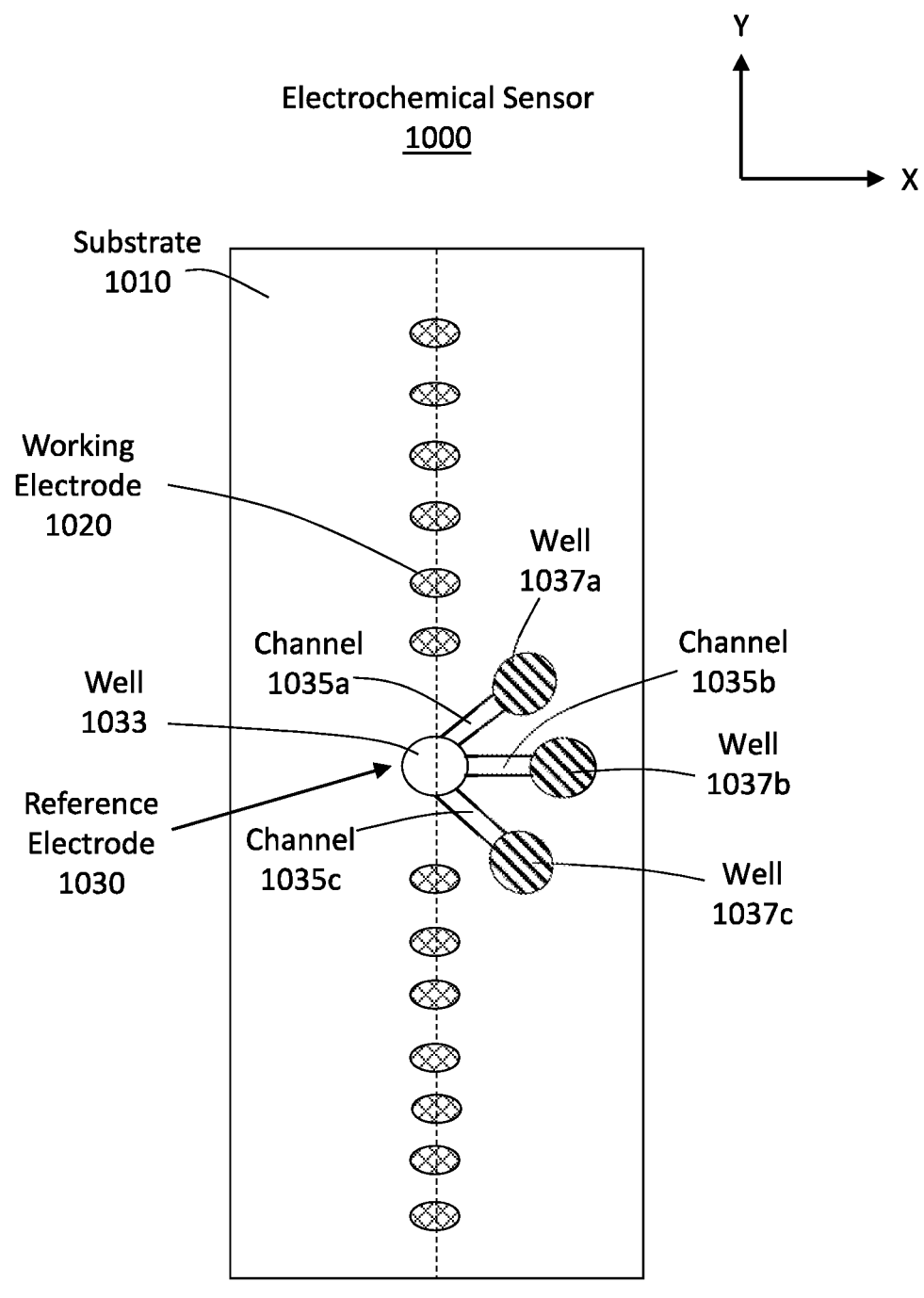
Figure 11:
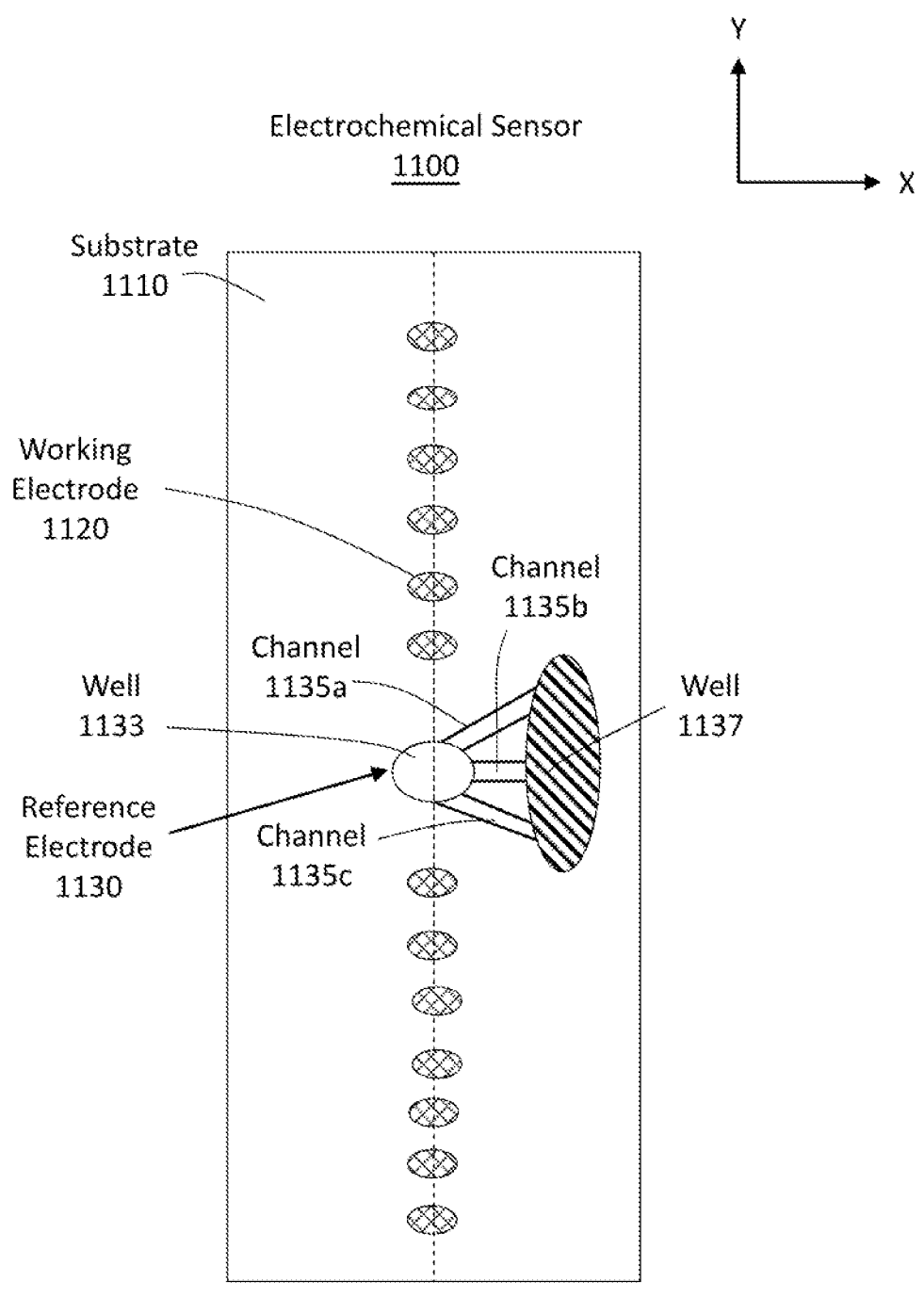
Figure 12:
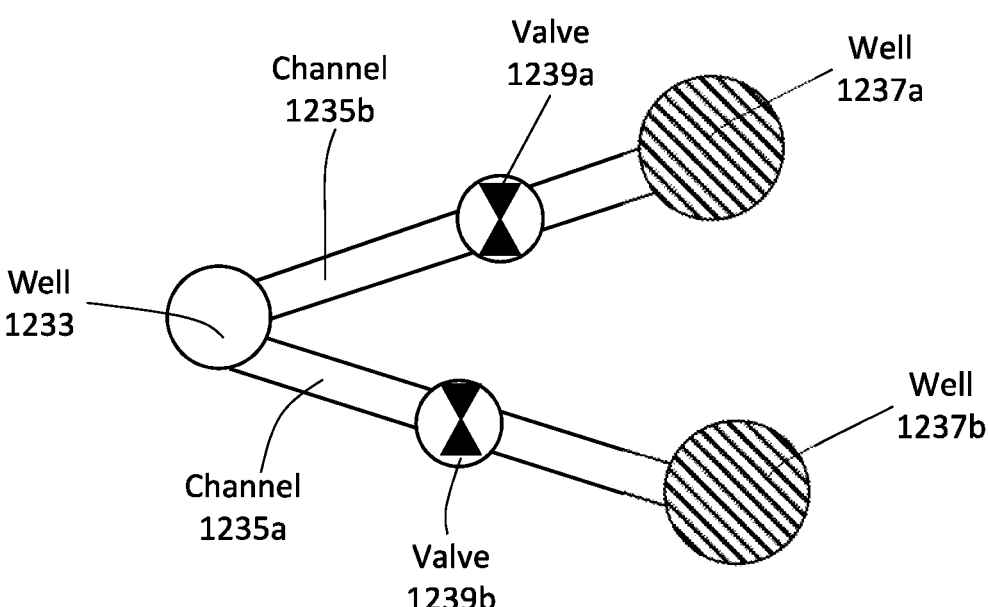
Figure 19:
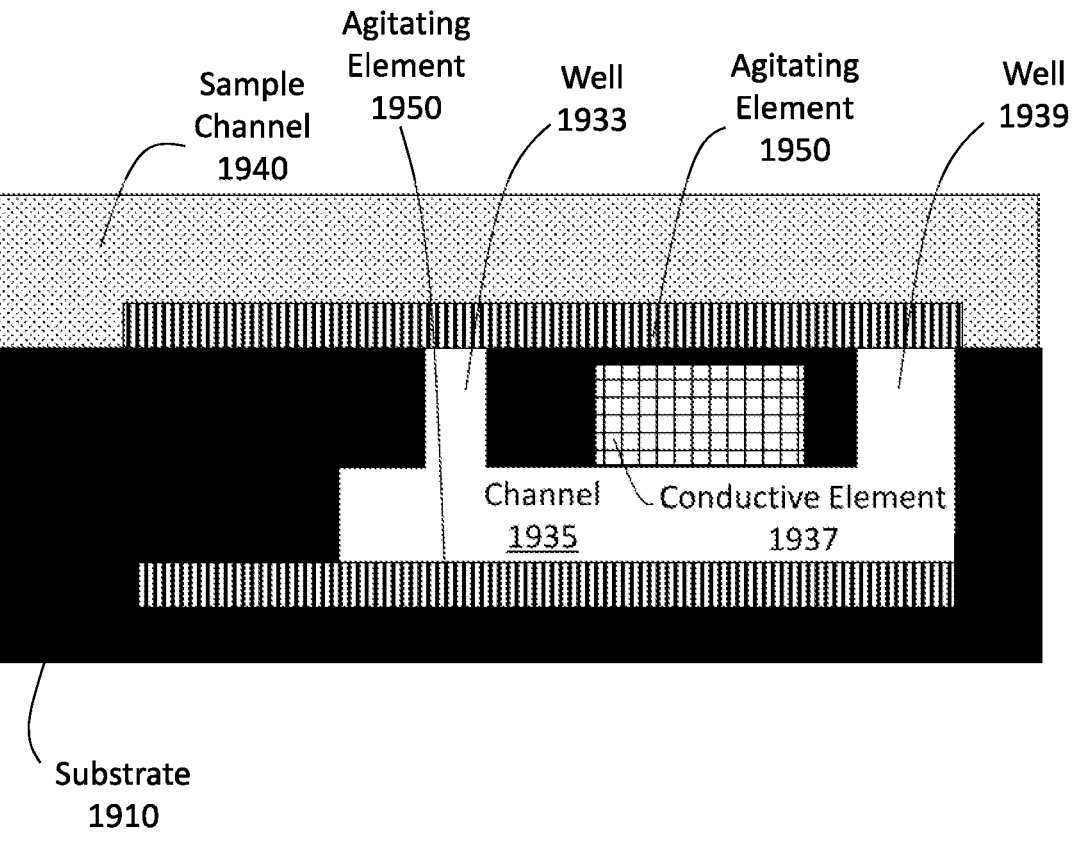
Figure 20A:
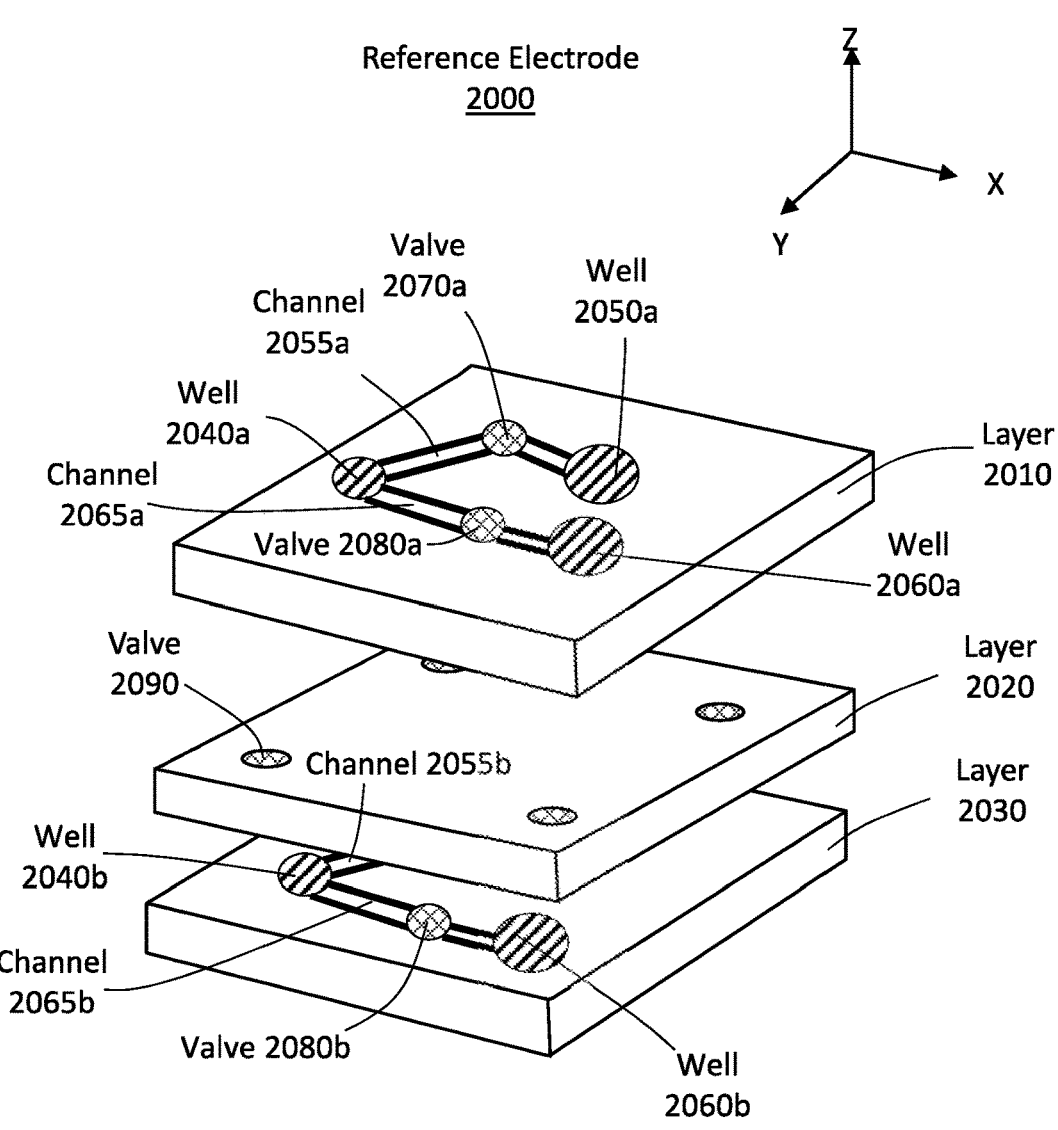
Figure 20B:
Figure 21:
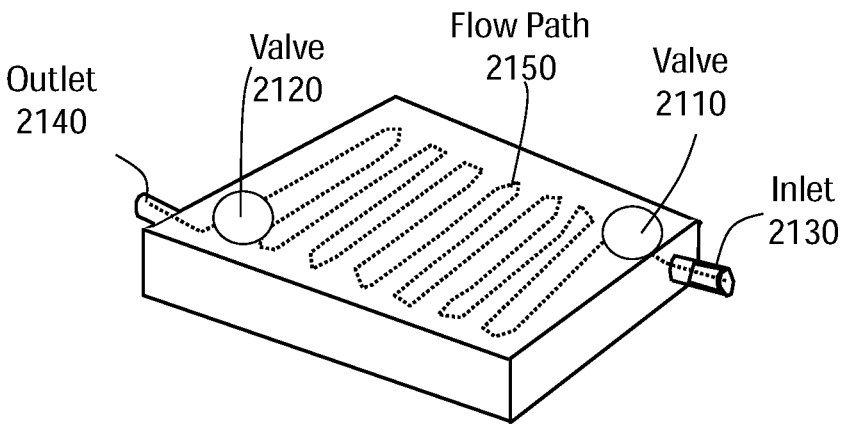

4 may be made to the following description, taken in conjunction with the accompanying figures, wherein like reference numerals represent like parts, in which:

FIG. 1 shows an example electrochemical sensor according to some embodiments of the present disclosure;

FIGS. 2A and 2B show an example working electrode according to some embodiments of the present disclosure;

FIGS. 3A and 3B show an example reference electrode according to some embodiments of the present disclosure;

FIGS. 4A-4D show another example reference electrode according to some embodiments of the present disclosure;

FIG. 5 shows an example electrochemical sensor including multiple reference electrodes according to some embodiments of the present disclosure;

FIG. 6 shows another example electrochemical sensor according to some embodiments of the present disclosure;

FIG. 7 shows yet another example electrochemical sensor according to some embodiments of the present disclosure;

FIGS. 8A and 8B show an example system including an electrochemical sensor including a cap according to some embodiments of the present disclosure;

FIG. 9 shows another example system including an electrochemical sensor including a cap according to some embodiments of the present disclosure;

FIG. 10 shows an example electrochemical sensor including a reference electrode with multiple channels according to some embodiments of the present disclosure;

FIG. 11 shows another example electrochemical sensor including a reference electrode with multiple channels according to some embodiments of the present disclosure;

FIG. 12 shows an example reference electrode with channels coupled to valves according to some embodiments of the present disclosure;

FIG. 13 shows an example reference electrode including agitating elements according to some embodiments of the present disclosure;

FIG. 14 shows an example interface between an agitating element and a wall according to some embodiments of the present disclosure;

FIGS. 15A-15C show example agitating elements with different shapes according to some embodiments of the present disclosure;

FIG. 16 shows an example reference electrode including heating elements according to some embodiments of the present disclosure;

FIG. 17 shows an example interface between a heating element and a wall according to some embodiments of the present disclosure;

FIGS. 18A-18C show example heating elements with different shapes according to some embodiments of the present disclosure;

FIG. 19 shows an example electrochemical sensor including a reference electrode over a sample channel according to some embodiments of the present disclosure;

FIGS. 20A and 20B show a reference electrode including multiple layers according to some embodiments of the present disclosure; and FIG. 21 shows valves controls an inlet and an outlet of a reference electrode according to some embodiments of the present disclosure.

DESCRIPTION OF EXAMPLE EMBODIMENTS OF THE DISCLOSURE

An electrochemical sensor has advantages such as simple measurement procedure, short response time, and sufficient sensitivity and selectivity. Electrochemical sensors have found widespread use in numerous applications. Biosensors are examples of such sensors. A biosensor is an analytical device that converts a biological response into an electrical signal.

An electrochemical sensor usually includes multiple types of electrodes in contact with an electrolyte. These electrodes may include working electrode (or sensing electrode), reference electrode, and counter electrode. A working electrode often includes two main components: a recognition element and a transducer. The recognition element selectively reacts with an analyte. This reaction is then converted into an electrical signal by the transducer. The recognition element and transducer form a sensing electrode of the electrochemical sensor. An electrochemical sensor may include multiple working electrodes. A reference electrode is usually held at a constant electrode potential with respect to the working electrode. In potentiometric sensors, the sensor response is a potential (voltage) differential that is measured between a sensing electrode (electrode where the chemical phenomena of interest takes place) and a reference electrode with stable reference potential that is not influenced by the analytes. The reference electrode serves as stable reference voltage for the measurement. In Amperometric (or Voltametric, etc.), the sensor response is a current that is measured between the sensing electrode and a counter electrode (in which counter reactions occur). Typically in Amperometric sensors (or Voltametric, etc.) a bias voltage is applied to the sensing electrode, in order to facilitate chemical reactions or physical processes. In the latter case, the bias voltage is applied against the reference electrode, so again it is important that the reference electrode potential is stable. Additionally, a presence of substances which interact with the working electrode/electrolyte interface can invoke current flow between the working electrode and the counter electrode as a result of reduction/oxidation (REDOX) reactions at the working electrode. In some cases, it can invoke a change in electrode potential, which is a result of the interaction between the analyte and the working electrode. In some other cases, it is a change in impedance or resistance, which may be proportional to the concentration of analyte.

High quality reference electrodes are important in electrochemical sensors. Reference electrodes are fundamental units in the many chemical sensors which rely on such electrochemical measurements including glucose sensors and fire alarms. The stability and robustness of the reference electrodes affect the accuracy, sensitivity, and longevity of the sensors.

The present disclosure relates to electrochemical sensors including reference electrodes. An example electrochemical sensor includes one or more reference electrodes and one or more working electrodes in a substrate. The electrochemical sensor may also include one or more counter electrodes in the substrate. A reference electrode may include a well and a channel defined by inner walls of the substrate, and a conductive element. The well extends from a first surface of a substrate towards a second surface of the substrate. The channel is in the substrate. A longitudinal axis of the channel may be substantially perpendicular to a longitudinal axis of the well. The channel has a first end connected to the well and the conductive element is exposed to a second end of the channel. The reference electrode may include an additional well that extends from the first surface towards the second surface. The additional well may be connected to the second end of the channel and may be in contact with the conductive element. The channel and the wells form a flow path of a conductive medium. For example, the conductive medium may be a solid or semi-solid membrane, or a liquid. The flow path may be coupled to an agitating element or heating element that promotes flow of the conductive medium. The agitating or heating element may help to alleviate any blockages or build up of sediment or in certain applications may improve the efficiency of the analytical process.

Compared with conventional reference electrodes, the reference electrodes in the present disclosure have lower drift and are more stable. The use of one or more channels limits the ionic diffusion between the test solution (or sample) and the reference electrode, hence providing a more stable reference electrode potential and thus providing more accurate sensor measurements. Miniaturised reference electrodes can be produced. Miniaturised reference electrodes can be used in microfluidic applications or other applications requiring miniaturization.

The following detailed description presents various descriptions of specific certain embodiments. However, the innovations described herein can be embodied in a multitude of different ways, for example, as defined and covered by the claims or select examples. In the following description, reference may be made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

Other features and advantages of the disclosure will be apparent from the following description and the claims.

As described herein, one aspect of the present technology may be the gathering and use of data available from various sources to improve quality and experience. The present disclosure contemplates that in some instances, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that may include X and Y.

In addition, the terms "comprise," "comprising," "include," "including," "have," "having" or any other variation thereof, are intended to cover a non-exclusive inclusion. For example, a method, process, device, or system that comprises a list of elements may be not necessarily limited to only those elements but may include other elements not expressly listed or inherent to such method, process, device, or system. Also, the term "or" refers to an inclusive or and not to an exclusive or.

The systems, methods and devices of this disclosure each have several innovative aspects, no single one of which may be solely responsible for all of the desirable attributes disclosed herein. Details of one or more implementations of the subject matter described in this Specification are set forth in the description below and the accompanying drawings.

FIG. 1 shows an example electrochemical sensor 100 according to some embodiments of the present disclosure. The electrochemical sensor 100 includes a substrate 110, working electrodes 120 (individually referred to as "working electrode 120"), and a reference electrode 130. In some embodiments, the electrochemical sensor 100 may include fewer, more, or different components. For instance, the electrochemical sensor 100 may include one or more counter electrodes, e.g., in embodiments where the electrochemical sensor 100 is a voltammetric or amperometric sensor.

The substrate 110 may include a plastic material, a semiconductor material (e.g., silicon, glass, etc.), a ceramic material, other types of material, or some combination thereof. The substrate 110 may be fabricated using, for example, injection molding, laminating, flexible/build up or additive manufacturing technologies, or other suitable techniques depending on the specific requirements of the application of the electrochemical sensor.

The working electrodes 120 include electrically conductive contacts (also referred to as "conductive contacts"). A conductive contact includes an electrically conductive material, which may be a metal, e.g., gold (Au), etc. In some embodiments, a conductive contact is recessed in the substrate. For instance, a working electrode 120 includes a working well and a conductive contact over (e.g., underneath) an end of the working well. In other embodiments, a conductive contact may be inlaid or protruding. In the embodiment of FIG. 1, the working electrodes 120 are aligned along a line 105, which is parallel to the Y-axis. The center of each working electrodes 120 are on the line 105. In other embodiments, the center of a working electrode may be slightly off the line 105. The working electrodes 120 may be substantially aligned, or may be unaligned.

The line 105 may indicate a location of a sample channel (not shown in FIG. 1) of the electrochemical sensor 100. For instance, the line 105 may indicate a location of a portion of the sample channel, e.g., the center line or an edge of the sample channel. The sample channel may provide test samples (or analytes) to the working wells of the working electrodes 120. A test sample may be a fluid, such as blood, other types of biofluid, etc. The sample channel may also be used to provide working membranes to the working electrodes 120.

The reference electrode 130 includes two wells 133 and 135 defined in the substrate 110 and a conductive contact exposed to the well 135. In some embodiments, the well 133 may be inside the sample channel but the well 135 may be outside the sample channel. The well 133 may be in direct contact with test samples. For example, the test sample may be provided through the sample channel, the test sample may be in a container surrounding the electrochemical sensor 100, or the test sample may be dispensed or placed in the well 133. But the well 135 may not be in direct contact with test samples. In the embodiment of FIG. 1, the well 133 is aligned with the working electrodes 120 along the Y-axis, whereas the well 135 is not aligned with the working electrodes 120. In other embodiments, the well 133 may be substantially aligned with the working electrodes 120, aligned with a subset of the working electrodes 120, or unaligned with the working electrodes 120. A distance 137 from the well 133 to the well 135, e.g., from the center of the well 133 to the center of the well 135 in the X-Y plane, is in a range from 1 mm to 2.5 mm. In some embodiments, the working electrodes 120 are coupled with a sample channel (or other source) that provides test samples to the working wells of the working electrodes 120. The sample channel may also be used to provide working membranes to the working electrodes 120.

There is no conductive contact exposed to the well 133. The conductive contact of the reference electrode 130 includes an electrically conductive material, which may be a metal (e.g., silver (Ag), gold (Au), platinum (Pt)), other conductive materials (e.g., carbon,) etc. In some embodiments, the conductive contact may include other materials. In an example, the conduct contact includes a mixture of a metal (e.g., Ag) and a non-metal (e.g., silver chloride (AgCl)). For instance, the metal can be formed on the non-metal through plating, e.g., selective plating. The two wells 133 and 135 may be connected through a channel between them. The channel may be separate from the sample channel. For instance, the channel may be located between a first surface and a second surface of the substrate 110 and extend laterally between the well 133 and the well 135. The wells 133 and 135 and the channel can be at least partially filled with a reference medium, e.g., a reference electrode electrolyte. The reference medium may be solid, semi-solid, or liquid, and may be referred to as a reference membrane. The conductive contact of the reference electrode 130 may be coupled to the test solution/sample or a working electrode 120 through the well 133 or 135. With this approach, diffusion of ions (e.g., Cl, etc) to/from the conductive contact of the reference electrode 130 is limited by lateral ion diffusion across the wells 133 and 135 and the channel, instead of the conventional bulk diffusion. Compared with the conventional bulk diffusion, the lateral ion diffusion is slower.

FIGS. 2A and 2B show an example working electrode 220 according to some embodiments of the present disclosure. The working electrode 220 may be an embodiment of the working electrode 120 in FIG. 1. As shown in FIG. 2A, the working electrode 220 is arranged in a substrate 210. The substrate 210 may be an embodiment of the substrate 110 in FIG. 1. The substrate 210 has surfaces 213 and 215, which opposite each other along the Z-axis.

The working electrode 220 includes a working well 223 and a conductive element 225. The working well 223 extends from the surface 213 towards the surface 215. The working well 223 has an opening 227 and an end 229. The opening 227 is on the surface 213. The end 229 is between the surface 213 and the surface 215. The conductive element 225 is underneath the end 229.

As shown in FIG. 2B, the working well 223 is partially filled with a working membrane 240. The working membrane 240 is in contact with the conductive element 225. In some embodiments, the working membrane 240 is an ion selective membrane (ISE) or other layers to impart selectivity.

FIGS. 3A and 3B show an example reference electrode 330 according to some embodiments of the present disclosure. The reference electrode 330 may be an embodiment of the reference electrode 130 in FIG. 1. The reference electrode 330 is arranged in a substrate 310. The substrate 310 may be an embodiment of the substrate 110 in FIG. 1. As shown in FIG. 3A, the substrate 310 has surfaces 313 and 315, which opposite each other along the Z-axis.

The reference electrode 330 includes a well 333, a channel 335, and a conductive element 337. The well 333 extends from the surface 313 towards the surface 315. The well 333 has an opening 332 and an end 334. The opening 332 is on the surface 313. The end 334 is between the surface 313 and the surface 315. The channel 335 extends along the X-axis. An end of the channel 335 is connected to the end 334 of the well 333. The other end of the channel 335 is connected to the conductive element 337. In some embodiments, a longitudinal axis of the channel 335 may be perpendicular, or substantially perpendicular, to a longitudinal axis of the well 333. For instance, the well 333 has a longitudinal axis along the Z-axis and the channel 335 has a longitudinal axis along the X-axis. The well 333 and the channel 335 constitute a flow path. The flow path can allow flow of a reference membrane, e.g., towards the conductive element 337. Also, the well 333 and the channel 335 constitute a "tortuous" path for ionic diffusion, which is slower than bulk diffusion.

As shown in FIG. 3B, a portion of the well 333 and the channel 335 are filled with a reference membrane 340. In some embodiments, the well 333 may be completely filled with the reference membrane 340. In the embodiment of FIG. 3B, the channel 335 is completely filled with the reference membrane 340. In other embodiments, the channel 335 may not be completely filled with the reference membrane 340. The reference membrane 340 is in contact with the conductive element 337. In some embodiments, the reference membrane 340 is a viscous material (e.g., electrolyte). The reference membrane 340 may become a solid material (e.g., a solid organic material) after solvent evaporation. Even though not shown in FIGS. 3A and 3B, the reference electrode 330 may include or coupled to a hole in the substrate 310, through which air can be vented from the substrate 310 as the reference membrane 340 is introduced to the reference electrode 330.

Figures 4A, 4B:
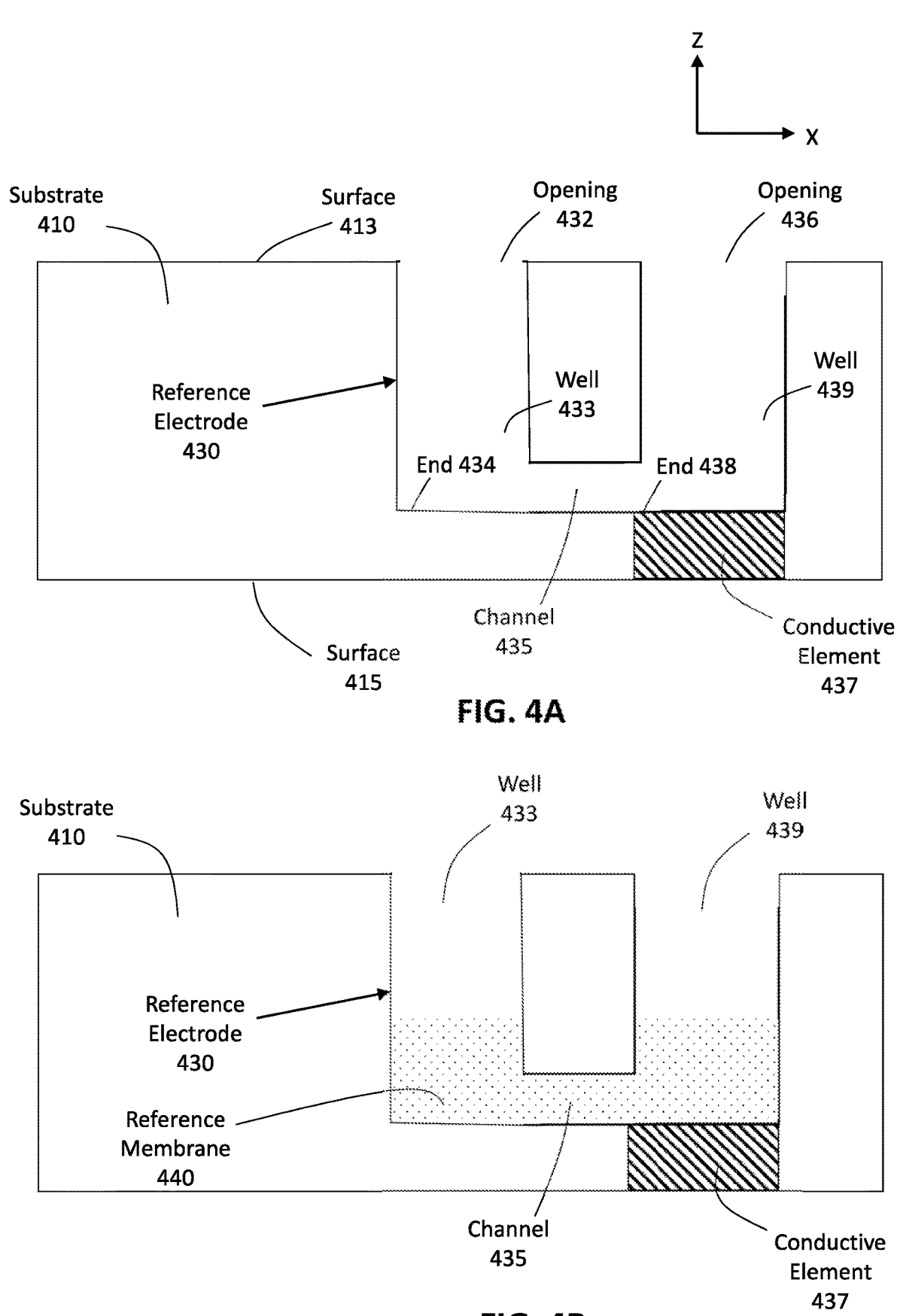

FIGS. 4A-4D show another example reference electrode 430 according to some embodiments of the present disclosure. The reference electrode 430 may be an embodiment of the reference electrode 130 in FIG. 1. The reference electrode 430 is arranged in a substrate 410. The substrate 410 may be an embodiment of the substrate 110 in FIG. 1. As shown in FIG. 4A, the substrate 410 has surfaces 413 and 415, which opposite each other along the Z-axis.

The reference electrode 430 includes wells 433 and 439, a channel 435, and a conductive element 437. The well 433 extends from the surface 413 towards the surface 415 along the Z-axis. The well 433 has an opening 432 and an end 434. The opening 432 is on the surface 413. The end 434 is between the surface 413 and the surface 415. The well 439 also extends from the surface 413 towards the surface 415 along the Z-axis. The well 439 has an opening 436 and an end 438. The opening 436 is on the surface 413. The end 438 is between the surface 413 and the surface 415.

The channel 435 extends along the X-axis. An end of the channel 435 is connected to the end 434 of the well 433. The other end of the channel 435 is connected to the end 438 of the well 439. In some embodiments, the end 434 may be at least partially overlap with the end of the channel 435. Similarly, the end 438 may be at least partially overlap with the other end of the channel 435. In some embodiments, a longitudinal axis of the channel 435 may be perpendicular, or substantially perpendicular, to a longitudinal axis of the well 433 or 439. For instance, the well 433 or 439 has a longitudinal axis along the Z-axis and the channel 435 has a longitudinal axis along the X-axis. The wells 433 and 439 and the channel 435 constitute a flow path. The flow path can allow flow of a reference membrane, e.g., towards the conductive element 437. Also, the wells 433 and 439 and the channel 435 including the membrane 440 constitute a "tortuous" path for ionic diffusion, which is slower than bulk diffusion. For example, the well 439 may allow greater volume of reference membrane 450 over the conductive element 437 (e.g., in comparison to FIG. 3B), which may provide a longer lifetime. Even though not shown in FIGS. 4A and 4B, the reference electrode 430 may include or coupled to a hole in the substrate 410, through which air can be vented from the substrate 410 as the reference membrane 440 is introduced to the reference electrode 430.

As shown in FIG. 4B, a portion of the well 433, the channel 435, and a portion of the well 439 are filled with a reference membrane 440. In some embodiments, the well 433 or 439 may be completely filled with the reference membrane 440. In the embodiment of FIG. 4B, the channel 435 is completely filled with the reference membrane 440. In other embodiments, the channel 435 may not be completely filled with the reference membrane 440. The reference membrane 440 is in contact with the conductive element 437. In some embodiments, the reference membrane 440 is a viscous material (e.g., electrolyte). The reference membrane 440 may become a solid material (e.g., a solid organic material) after solvent evaporation.

Figure 4C:
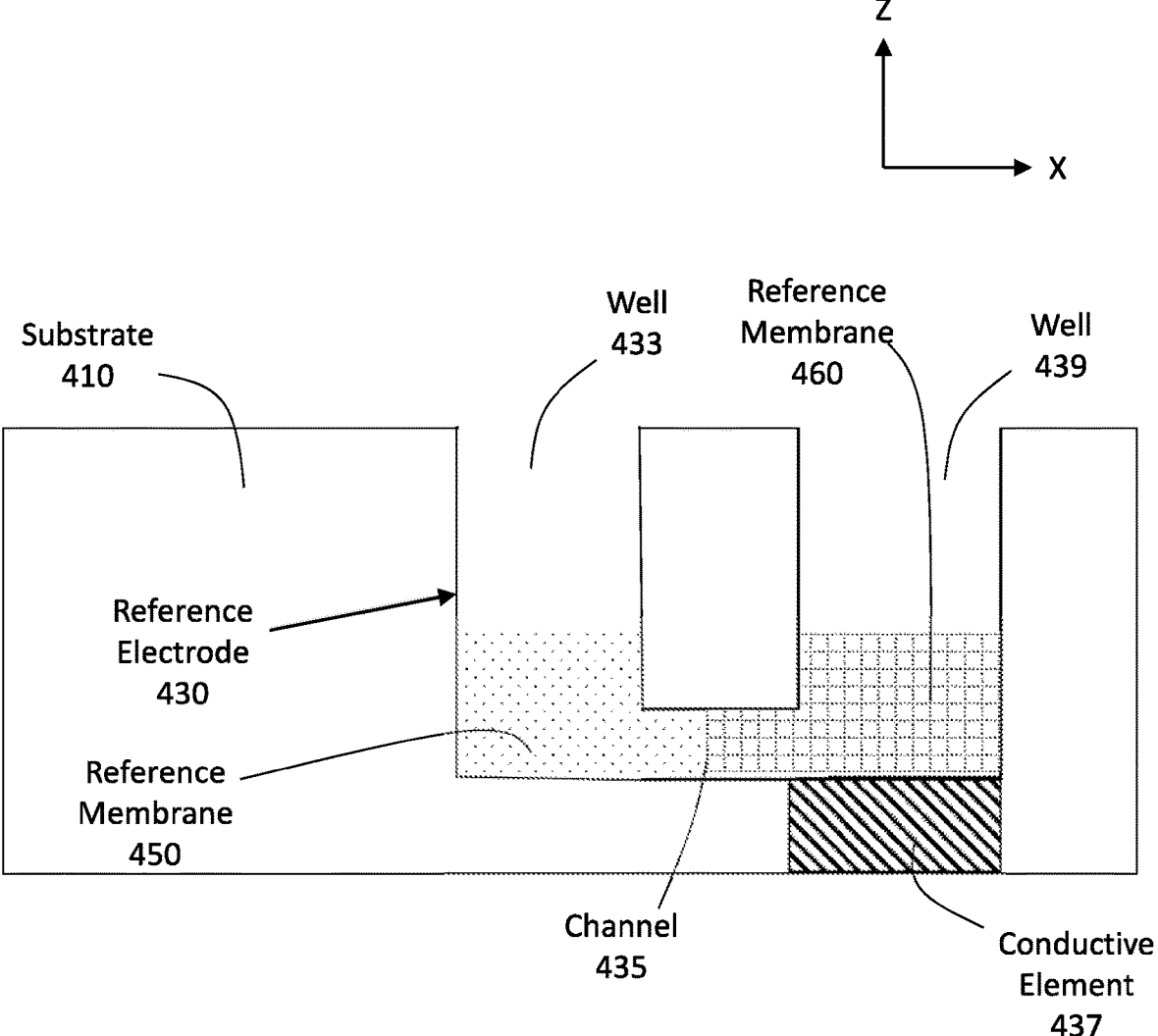

As shown in FIG. 4C, a portion of the well 433 and a portion of the channel 435 are filled with a reference membrane 450, but the other portion of the channel 435 and a portion of the well 439 are filled with a different reference membrane 460. In some embodiments, the well 433 or 439 may be completely filled with the reference membrane 450 or 460. In the embodiment of FIG. 4D, the channel 435 is completely filled with the reference membranes 450 and 460. In other embodiments, the channel 435 may not be completely filled with the reference membranes 450 and 460. The reference membrane 460 is in contact with the conductive element 437. In some embodiments, the reference membrane 450 may be a solid membrane (e.g., a solid organic material) and the reference membrane 460 may be an aqueous membrane. The reference membrane 460 may include a gel, such as sodium chloride (NaCl) gel, potassium chloride (KCl) gel. The reference membrane 460 may include a polymer, e.g., Nafion (brand name for a sulfonated tetrafluoroethylene based fluoropolymer-copolymer). The reference membrane 460 may include other materials. An example of the reference membrane 460 is 1% agarose with NaCl.

The channels 335 and 435 in FIGS. 3A, 3B, 4A, and 4B have rectangular shapes in the X-Z plane. In other embodiments, the channel 335 or 435 may have a different shape depending on the specific requirements of the application. For instance, a dimension of the channel 335 along the Z-axis may increase or decrease in a direction from the well 333 to the conductive element 337 along the X-axis. Similarly, a dimension of the channel 435 along the Z-axis may increase or decrease in a direction from the end 434 to the end 438 along the X-axis. Also, the longitudinal axis of the channel 335 or 435 may not be perpendicular to the longitudinal axis of the wells.

FIG. 5 shows an example electrochemical sensor 500 including multiple reference electrodes 530 and 540 according to some embodiments of the present disclosure. The reference electrodes 530 and 540 may have similar or different components. An embodiment of the reference electrode 530 or 540 may be the reference electrode 130, 330, or 430. The reference electrode 530 includes two wells 533 and 535. The well 535 is associated with a conductive conduct, which may be underneath an end of the well 535. The reference electrode 530 may also include a channel (not shown in FIG. 5) that connects the well 533 to the well 535 to form a flow path. The reference electrode 540 includes three wells 543, 545, and 547. The well 543 is between the well 545 and the well 547. Each of the wells 545 and 547 is associated with a conductive conduct, which may be underneath an end of the well. The reference electrode 540 may also include a first channel (not shown in FIG. 5), which connects the well 543 to the well 545 to form a first flow path, and a second channel (not shown in FIG. 5), which connects the well 543 to the well 547 to form a second flow path. In some embodiments, a benefit of having the two wells 545 and 547 with conductive elements is having the redundancy so that in cases where one of the conductive elements fails, the reference electrode 540 still has a conductive element that can work.

In other embodiments, the electrochemical sensor 500 may include more reference electrodes 530 or 540. The electrochemical sensor 500 also includes a substrate 510 and working electrodes 520 (individually referred to as "working electrode 520"). In some embodiments, the reference electrodes 530 and 540 are electrically coupled to different working electrodes 520. In other embodiments, the reference electrodes 530 and 540 may be electrically coupled to same working electrodes 520. Also, the reference electrodes 530 and 540 may operate simultaneously or at different times. In some embodiments, each reference electrode includes a valve, e.g., arranged at a channel between the two wells of the reference electrode. The valve may control flow of reference membranes in the reference electrode and control operation of the reference electrode. For instance, a reference electrode may be turned off by closing the valve, which prevents flow of the reference membrane and be turned on by opening the valve. The valves can be used to select which reference electrode to use.

FIG. 6 shows another example electrochemical sensor 600 according to some embodiments of the present disclosure. The electrochemical sensor 600 includes a substrate 610, working electrodes 620 (individually referred to as "working electrode 620"), a reference electrode 630, and a sample channel 640. The reference electrode 630 has a single well that is outside the sample channel 640. The well may not be in direct contact with sample.

FIG. 7 shows yet another example electrochemical sensor 700 according to some embodiments of the present disclosure. The electrochemical sensor 700 includes a substrate 710, working electrodes 720 (individually referred to as "working electrode 720"), and a reference electrode 730. In some embodiments, the electrochemical sensor 700 may include fewer, more, or different components. For instance, the electrochemical sensor 700 may include one or more counter electrodes, e.g., in embodiments where the electrochemical sensor 700 is a voltametric or amperometric sensor. The reference electrode 730 includes an elongated well to be filled with a reference membrane. The elongated well 733 has one end, which is between working electrodes 720, and another end, which is coupled to a conductive element 735. For instance, the conductive element 735 may be over the other end of the elongated well 733. In the embodiment of FIG. 7, the elongated well 733 has extends along the X-axis and has a longitudinal axis along the X-axis. In some embodiments, the reference electrode 730 includes a polymer (e.g., PVC (polyvinyl chloride), LCP (liquid crystal polymer), etc.) that covers a part or the whole elongated well 733 to define the elongated well 733. In other cases, e.g. using Flex technology, a solder mask may be placed under the polymer to ensure no copper is exposed.

In the embodiment of FIG. 7, the elongated well 733 has a race-track shape in the X-Y plane. In other embodiments, the elongated well 733 may have a different shape in the X-Y plane, e.g., rectangular, oval, trapezoid, and so on. Also, the length of the elongated well 733 along the X-axis may vary. The different shapes, depths, and locations of the wells, channels, and relative openings can be optimized depending on the specific requirements of the application.

FIGS. 8A and 8B show an example electrochemical sensor 800 including a cap 810 according to some embodiments of the present disclosure. FIG. 8B is a cross section of FIG. 8A along the line B-B. The electrochemical sensor 800 also includes working electrodes 820 (individually referred to as "working electrode 820"), a reference electrode, and a sample channel 840. An interface between the electrodes and a sample is inside the sample channel 840. The cap 810 defines the sample channel 840 where the working electrodes 820 are arranged. In some embodiments, the cap 810 is over a substrate in which the working electrodes 820 and reference electrode are arranged, such as the substrate 110, 210, 310, 410, 510, 610, or 710. The cap 810 may partially cover a surface of the substrate, e.g., cover the whole surface except the sample channel 840. The reference electrode may include a first well 833, which has an opening inside the sample channel 840, and a second well 839, which has an opening outside the sample channel 840. The cap 810 does not cover or seal the first well 833 of the reference electrode. The first well may receive test sample provided to the electrochemical sensor 800, e.g., through the sample channel 840. In the embodiment of FIGS. 8A and 8B, a membrane 830 is present in the first well 833. The membrane 830 may be one of the membranes that are described above. The cap 810 may cover (or seal) the opening of the second well 839 of the reference electrode. The second well 839 may not be in direct contact with test samples. A conductive element 835 may be exposed to the second well 839. The cap 810 may include a rubber gasket, adhesive tape, epoxy, lid, cartridge, microfluidic substrate, and so on. The cap 810 may be used with other electrochemical sensors, such as any of the other electrochemical sensors described herein.

FIG. 9 shows another example electrochemical sensor 900 including a cap 910 according to some embodiments of the present disclosure. The electrochemical sensor 900 also includes working electrodes 920 (individually referred to as "working electrode 920"), a reference electrode, and a sample channel 940. The cap 910 may be the same as or similar to the cap 810 in FIGS. 8A and 8B. The cap 910 defines a sample channel 940 where the working electrodes 920 are arranged. The reference electrode may include a well having an opening inside the sample channel 940. The opening is not covered by the cap 910. The reference electrode may also include another well outside the sample channel 940, which may be covered or sealed by the cap 910. A membrane 930 is present in the well of the reference electrode that is inside the sample channel 940.

FIG. 10 shows an example electrochemical sensor 1000 including a reference electrode 1030 with multiple channels 1035*a*-*c* according to some embodiments of the present disclosure. The electrochemical sensor 1000 also includes a substrate 1010 and working electrodes 1020 (individually referred to as "working electrode 1020"). In some embodiments, the electrochemical sensor 1000 may include fewer, more, or different components. For instance, the electrochemical sensor 1000 may include one or more counter electrodes.

The reference electrode 1030 includes a well 1033, the channels 1035*a*-*c* (collectively referred to as "channels 1035" or "channel 1035"), and wells 1037*a*-*c* (collectively referred to as "wells 1037" or "well 1037"). In some embodiments, the well 1033 is inside a sample channel and may be in direct contact with a sample provided through the sample channel. The wells 1037 may be outside the sample channel and not in direct contact with the sample. Each channel 1035 provides a flow path from the well 1033 to a well 1037. For instance, the channel 1035 has a first end, which is connected to an end of the well 1033, and a second end, which is connected of the well 1037. The second end opposite the first end. A conductive element is coupled to each well 1037. For instance, the conductive element may be over the end of the well 1037 that is connected to the corresponding channel 1035. The conductive elements may operate separately. In some embodiments, the conductive elements are insulated from each other and different electrical potentials may be applied on the conductive elements at a same time.

The well 1033, channel 1035, and a well 1037 forms a flow path for a reference membrane that the conductive element can be in contact with. As there are three channels 1035 and three wells 1037, the reference electrode 1030 can provide three flow paths, all of which start with the well 1033. In other embodiments, the reference electrode 1030 may include a different number of channels 1035 and a different number of wells 1037.

FIG. 11 shows another example electrochemical sensor 1100 including a reference electrode 1130 with multiple channels 1135*a*-*c* according to some embodiments of the present disclosure. The electrochemical sensor 1100 also includes a substrate 1110 and working electrodes 1120 (individually referred to as "working electrode 1120"). In some embodiments, the electrochemical sensor 1100 may include fewer, more, or different components. For instance, the electrochemical sensor 1100 may include one or more counter electrodes.

The reference electrode 1130 includes a well 1133, the channels 1135*a*-*c* (collectively referred to as "channels 1135" or "channel 1135"), and another well 1137. Each channel 1135 provides a flow path from the well 1133 to the well 1137. For instance, the channel 1135 has a first end, which is connected to an end of the well 1133, and a second end, which is connected of the well 1137. The second end opposite the first end. A conductive element is coupled to the well 1137 can may be in contact with a reference membrane that flows to the well 1137 through some or all of the three channels 1135. For instance, the conductive element may be over the end of the well 1137 that is connected to the channels 1135. The well 1133, channels 1135, and well 1137 forms a flow path for a reference membrane. The flow of the reference membrane may start from the well 1133, then diverge into the three channels 1135, and merge together in the well 1137. In some embodiments, a channel 1135 may be blocked, e.g., by closing a valve.

FIG. 12 shows an example reference electrode 1230 with channels 1235*a* and 1235*b* coupled to valves 1239*a* and 1239*b* according to some embodiments of the present disclosure. The reference electrode 1230 also includes a well 1233 and wells 1237*a* and 1237*b*. The channel 1235*a* is connected to the well 1233 and 1237*a*. The channel 1235*b* is connected to the well 1233 and 1237*b*. Thus, the reference electrode 1230 forms two flow paths. The valve 1239*a* is arranged along the channel 1235*a* and can control flow of the conductive medium within the channel 1235*a*. For instance, when the valve 1239*a* is open, a reference membrane can flow from the well 1233 to the well 1237*a* through the channel 1235*a*, so that the reference membrane can reach the conductive element underneath the well 1237*a*. When the valve 1239*a* is closed, the valve 1239*a* becomes a barrier that stops the reference membrane from flowing through the channel 1235*a* and reaching the conductive element. Similarly, the valve 1239*b* is arranged along the channel 1235*b* and can control flow within the channel 1235*b*. The valves 1239*a* and 1239*b* can be used to select which conductive element to be enabled/accessed. In some embodiments, the electrical conductive element (underneath the well 1237*a*) is configured to be used for wireless communication, and the additional electrical conductive element (underneath the well 1237*b*) is configured to be used for wire communication. In some embodiments, the valve 1239*a* or 1239*b* may be a hydrophobic valve. In other embodiments, the valve 1239*a* or 1239*b* may be a barrier that can be ruptured by applying energy, e.g., electrical voltage, pulses of electrical current, mechanical vibration. In some embodiments, the valve may include an electroactive polymer located on a wall of the channel 1235*a* or 1235*b*. When a stimulus (e.g., electrical field) is applied to the valve, the electroactive polymer can impede fluid flow within the channel. For instance, the electroactive polymer may expand to close the valve. The material, shape and construction of the valve can be optimized depending on the specific requirements of the application.

FIG. 13 shows an example reference electrode 1330 including agitating elements 1340*a*-*d* according to some embodiments of the present disclosure. The reference electrode 1330 includes wells 1333 and 1339, a channel 1335 between the wells 1333 and 1339, and a conductive element 1337 underneath the well 1339 in a substrate 1310. The wells 1333 and 1339 and the channel 1335 form a flow path of a conductive medium. The agitating elements 1340*a*-*d* (collectively referred to as "agitating elements 1340" or "agitating element 1340") are arranged on walls of the well 1333 and channel 1335. As shown in FIG. 13, the agitating elements 1340*a* and 1340*b* are arranged on an outside surface of the channel 1335, the agitating element 1340*c* is arranged on an outside surface of the channel 1335, and the agitating element 1340*d* is arranged on another outside surface of the channel 1335. In other embodiments, the reference electrode 1330 may include a different number of agitating elements 1340, agitating elements 1340 arranged at different locations (e.g., on a wall of the well 1339), or agitating elements 1340 of different sizes or shapes. Also, the reference electrode 1330 may include a different flow path, e.g., a flow path that includes one well and one channel.

An agitating element 1340 is configured to agitate flow of the reference membrane in the flow path. For instance, an agitating element 1340 may create movement to manipulate or move fluid present in the flow path. An agitating element 1340 may exert a mechanical stress on the flow path, e.g., in response to an electrical signal (e.g., an electrical field), a radio frequency signal, or other types of signals. The mechanical stress may change a size or shape of the flow path (e.g., a size or shape of the well 1333 or of the channel 1335), which can promote or demote flow of the reference membrane in the flow path. An agitating element 1340 may include an electroactive polymer or a piezoelectric material, FIG. 14 shows an example interface between an agitating element 1420 and a wall 1410 of a flow path in a reference electrode according to some embodiments of the present disclosure. The agitating element 1420 may be an embodiment of an agitating element 1340 in FIG. 13. The wall 1410 may be a wall of the well 1333 or a wall of the channel 1335. As shown in FIG. 14, the interface is not smooth. Rather, the agitating element 1420 has protrusions that correspond to recesses in the wall 1410. Such a "rough" interface can improve the adhesion between the agitating element 1420 and the wall 1410. It can also affect how the structure will move, deflect, or flex to interact with the fluid in the flow path.

FIGS. 15A-15C show example agitating elements 1520*a-c* with different shapes according to some embodiments of the present disclosure. The agitating elements 1520*a-c* are arranged on walls 1510*a-c*, respectively. FIG. 15A shows the agitating element 1520*a*, which has a circular shape in the X-Y plane. FIG. 15B shows the agitating element 1520*b*, which has ring shapes in the X-Y plane. FIG. 15C shows the agitating element 1520*c*, which has rectangular shapes in the X-Y plane. In other embodiments, an agitating element may have different shapes from the shapes shown in FIGS. 15A-15C. An agitating element may be patterned based on the need of the application. The pattern or shape will affect the movement of the channel structure and how the fluid is manipulated. The relative shape and interface between the agitating element and the wall can be modified to optimize the required movement and hence the level of agitation imparted to the membrane or material in the channel. The agitating element may be a piezoelectric material (e.g., lead zirconate titanate (PZT), barium titanate, Gallium Nitride, Zinc oxide, Polyvinylidene fluoride, ferroelectric material with perovskite-structures etc.) or electroactive polymer (e.g., a Ferroelectric polymer—such as polyvinylidene fluoride, ionic polymer metal composites, stimuli-responsive gels, electrostrictive graft polymers, etc.) or conductive material such that the application of a stimulus (e.g., voltage, current, etc.) can cause structures to deform or expand or contract or warp which in turn impart agitating forces to the medium/fluid/membrane in the channel. In certain embodiments, the stimulus could be applied in a pulsed or intermittent fashion imparting pulsed or intermittent agitating forces to manipulate the fluid/medium/membrane in the channel. The shape/size/thickness/interfaces between the agitating elements and adjacent layers can be modified and optimized depending on the specific requirements of the application.

NOW FIG. 16 shows an example reference electrode 1630 including heating elements 1640A-D according to some embodiments of the present disclosure. The reference electrode 1630 includes wells 1633 and 1639, a channel 1635 between the wells 1633 and 1639, and a conductive element 1637 underneath the well 1639 within a substrate 1610. The wells 1633 and 1639 and the channel 1635 form a flow path of a reference membrane. The heating elements 1640*a-d* (collectively referred to as "heating elements 1640" or "heating element 1640") are arranged on walls of the well

1633 and channel 1635. As shown in FIG. 16, the heating elements 1640*a* and 1640*b* are arranged on an outside surface of the channel 1635, the heating element 1640*c* is arranged on an outside surface of the channel 1635, and heating element 1640*d* is arranged on another outside surface of the channel 1635. In other embodiments, the reference electrode 1630 may include a different number of heating elements 1640, heating elements 1640 arranged at different locations (e.g., on a wall of the well 1639), or heating elements 1640 of different sizes or shapes. A heating element may be arranged on an inside surface of the flow path. Also, the reference electrode 1630 may include a different flow path, e.g., a flow path that includes one well and one channel. A heating element 1640 is configured to increase a temperature of a fluid in the flow path. A heating element 1640 may provide heat to the fluid, e.g., in response to an electrical signal (e.g., an electrical field) or other types of signals. The shape and location and quantity of the heating elements can be optimized depending on the application and convection currents or heat treatment stages required. This also applies to piezoelectric elements that may be incorporated into the structures to manipulate or agitate fluid.

FIG. 17 shows an example interface between a heating element 1720 and a wall 1710 of a flow path according to some embodiments of the present disclosure. The heating element 1720 may be an embodiment of a heating element 1640 in FIG. 16. The wall 1710 may be a wall of the well 1333 or a wall of the channel 1335. As shown in FIG. 17, the interface is not smooth. Rather, the heating element 1720 has protrusions that correspond to recesses in the wall 1710. Such a "rough" interface can improve the adhesion between the heating element 1720 and the wall 1710. This principle could also be applied to the addition of an electroactive or piezoelectric layer. In the way that the layers of a bimetallic strip will bend or flex defined sections of a channel could also be constructed to deflect/move and manipulate fluid in a desired manner, which can be optimized depending on specific applications of the electrochemical sensor.

FIGS. 18A-18C show example heating elements 1820*a-c* with different shapes according to some embodiments of the present disclosure. The heating elements 1820*a-c* are arranged on walls 1810*a-c*, respectively. FIG. 18A shows the heating element 1820*a*, which has a circular shape in the X-Y plane. FIG. 18B shows the heating element 1820*b*, which has ring shapes in the X-Y plane. FIG. 18C shows the heating element 1820*c*, which has rectangular shapes in the X-Y plane. In other embodiments, a heating element may have different shapes from the shapes shown in FIGS. 18A-18C. A heating element may be patterned based on the need of the application. The shape, location and number of elements can be optimized depending on specific thermal currents or heat treatment steps required by specific applications of the electrochemical sensor.

FIG. 19 shows an example electrochemical sensor 1900 including a reference electrode over a sample channel 1940 according to some embodiments of the present disclosure. In this example, the sample channel 1940 may represent any source of sample including a container in which the electrochemical sensor 1900 is dipped or an aliquot of sample dispensed or applied to the electrochemical sensor 1900. The electrochemical sensor 1900 also includes a substrate 1010 and working electrodes (not shown in FIG. 19). The substrate 1910 may be an embodiment of the substrate 110 in FIG. 1. In some embodiments, the electrochemical sensor 1900 may include fewer, more, or different components. For instance, the electrochemical sensor 1900 may include one or more counter electrodes. The shape, location and position of the agitating elements can be modified and optimized depending on the requirements of the specific application.

The sample channel 1940 may be used to provide test sample and working membranes to the working electrodes. As shown in FIG. 19, the reference electrode is underneath the sample channel 1940. The reference electrode includes a well 1933, a channel 1935, a conductive element 1937, another well 1939, and agitating elements 1950 (individually referred to as "agitating element 1950"). In some embodiments, the conductive element 1937 is arranged on a surface of the channel 1935. The channel 1935 is connected to the well 1933, constituting a flow path of a fluid to the conductive element 1937. The channel 1935 is also connected to the well 1939. The well 1939 may function as a venting hole, through which air (e.g., air from the solidification of the fluid) may be vented out from the reference electrode.

As shown in FIG. 19, the agitating elements 1950 are coupled to the wells 1933 and 1939 and the channel 1935. The agitating elements 1950 can change flow of the fluid in the flow path. In some embodiments, an agitating element 1950 is a coil, which can be energized by radio frequency signals. The coil may agitate, e.g., pulse, fluid within a defined proximity in response to a radio frequency signal. Characteristics of the coil (e.g., shape, construction, material, stack of adjacent materials, etc.) may be determined based on the specific application of the electrochemical sensor 1900. The agitating elements 1950 can be integrated with the sample channel 1940 such that external radio frequency signals can be applied to the agitating elements 1950. Even though not shown in FIG. 19, the electrochemical sensor 1900 may include heating elements to heat up the fluid in the flow path. The agitating element 1950 may include an electroactive polymer or a piezoelectric material. The size or shape of the agitating element 1950 can be optimized depending on specific applications of the electrochemical sensor and the required manipulation of the fluid.

FIGS. 20A and 20B show a reference electrode 2000 including multiple layers 2010, 2020, and 2030 according to some embodiments of the present disclosure. FIG. 20A is a perspective view of the reference electrode 2000. FIG. 20B is a side view of the reference electrode 2000. The layers 2010, 2020, and 2030 are stacked together along the Z-axis. The layer 2020 is between the layer 2010 and 2030.

As shown in FIG. 20A, the layer 2010 includes wells 2040a, 2050a, and 2060a, channels 2055a and 2065a, and valves 2070a and 2080a. The channel 2055a is connected to the wells 2040a and 2050a to form a first flow path. The channel 2065a is connected to the wells 2040a and 2060a to form a second flow path. The valve 2070a is coupled to the channel 2055a to control the first flow path. The valve 2080a is coupled to the channel 2065a to control the second flow path.

Similarly, the third layer 2030 includes wells 2040b, 2050, and 2060b, channels 2055b and 2065b, and valves 2070 and 2080b. As illustrated, the well 2050 and the valve 2070 in the third layer 2030 corresponding to the well 2050a and valve 2070a are covered by the second layer 2020 and not shown. The channel 2055b is connected to the wells 2040b and 2050a to form a first flow path. The channel 2065b is connected to the wells 2040b and 2060b to form a second flow path. The valve 2070 in the third layer corresponding to the valve 2070a is coupled to the channel 2055b to control the first flow path. The valve 2080b is coupled to the channel 2065b to control the second flow path. In some embodiments, each well in the third layer 2030 may be aligned with a well in the layer 2010. For instance, the well 2040b may be aligned with the well 2040a, the well 2050 (not shown) may be aligned with the corresponding well 2050a, and the well 2060b may be aligned with the well 2060b. Also, the channel 2055b may be aligned with channel 2055b, and the channel 2065b may be aligned with the channel 2065b or each layer could operate independently with different/non-aligned paths or networks. A fluid may also flow from a well or channel in the layer 2010 to the corresponding well or channel in the layer 2030 through the layer 2020. In other embodiments, some or all of the layers 2010, 2020, and 2030 may operate independently. The flow path or flow network in a layer may be different from the flow path or flow network in another layer. A layer may have a flow path or flow network (e.g., a well, channel, or both) that is unaligned with another layer. A system can be constructed such that fluid can flow laterally within layers and also between layers. This may enable systems where material may be processed/analyzed on multiple layers in parallel.

The second layer 2020 includes valves 2090 (individually referred to as "valve 2090"). The valves 2090 control the flow of the fluid from the layer 2010 to the layer 2030. In other embodiments, the second layer 2020 may include a different number of valves 2090 and the valves 2090 may have different positions in the second layer 2020. In some embodiments, the number or positions of valves in the layer 2020 may be determined to enable fluid to flow between the layers 2010, 2020, and 2030. The number or positions of valves in the layer 2020 may be determined based on locations of the channels 2055a, 2055b, 2065a, and 2065b, the wells 2040a, 2040b, 2050a, 2050 (not shown), 2060a, and 2060b, or other components in the layers 2010 or 2030, such as ports. The number or positions of valves in the layer 2020 may also be determined based on requirements or processing steps of the system where the reference electrode 2000 is used. The reference electrode 2000 may be used in a vertically integrated system, where fluid can flow laterally within a single layer as well as flow vertically between layers. The lateral flow and vertical flow can be controlled by using valves. The valves used in the system may be constructed using materials/structures described above. The shape/size/material/construction of the valve can be modified and optimized depending on the specific requirements of the application.

FIG. 21 shows valves 2110 and 2120 controls an inlet 2130 and an outlet 2140 of a reference electrode 2100 according to some embodiments of the present disclosure. The valve 2110 is coupled with the inlet 2130. When the valve 2110 is open, a fluid can flow into the reference electrode 2100 through the inlet 2130. The valve 2120 is coupled with the outlet 2140. When the valve 2120 is open, a fluid can flow out from the reference electrode 2100 through the outlet 2140. The dash line represents an example flow path 2150 inside the reference electrode 2100.

Numerous other aspects emerge from the foregoing detailed description and annexed drawings. Those aspects are represented by the following Clauses.

Clause 1. A reference electrode in an electrochemical sensor, the reference electrode comprising: a substrate including: a first inner wall defining a first well in the substrate, the first well extending from a first surface of the substrate towards a second surface of the substrate, wherein the first surface is opposite the second surface; a second inner wall defining a second well in the substrate, the second well extending from the first surface towards the second surface; an electrically conductive element exposed to the second well; and a third inner wall defining a channel arranged between the first surface and the second surface, wherein a first end of the channel is connected to the first well, a second end of the channel is connected to the second well, and the first end is opposite the second end.

Clause 2. The reference electrode of clause 1, wherein a first end of the second well is on the first surface, a second end of the second well is between the first surface and the second surface, and the electrically conductive element is between the second end and the second surface.

Clause 3. The reference electrode of clause 1 or 2, wherein the electrically conductive element is configured to be in contact with a reference conductive medium, and the first well, the channel, or the second well are configured to be at least partially filled with the reference conductive medium.

Clause 4. The reference electrode of clause 3, wherein the reference conductive medium is a solid or semi-solid membrane, or a liquid.

Clause 5. The reference electrode of any of clauses 1-4, the substrate further comprising: a fourth inner wall defining a third well in the substrate, the third well extending from the first surface towards the second surface; an additional electrical conductive element arranged in the third well; and a fifth inner wall defining an additional channel arranged between the first surface and the second surface, wherein a first end of the additional channel is connected to the first well, a second end of the additional channel is connected to the third well, and the first end of the additional channel is opposite the second end of the additional channel.

Clause 6. The reference electrode of clause 5, further comprising: a valve coupled to the channel and configured to control flow of a conductive medium through the channel; and an additional valve coupled to the additional channel and configured to control flow of the conductive medium through the additional channel.

Clause 7. The reference electrode of clause 5 or 6, wherein the electrical conductive element is configured to be used for wireless communication, and the additional electrical conductive element is configured to be used for wire communication.

Clause 8. The reference electrode of any of clauses 1-7, the substrate further comprising: a fourth inner wall defining an additional channel arranged between the first surface and the second surface, wherein a first end of the additional channel is connected to the first well, a second end of the additional channel is connected to the second well, and the first end of the additional channel is opposite the second end of the additional channel.

Clause 9. The reference electrode of any of clauses 1-8, further comprising: an agitating element arranged on a wall of the first well or the channel, wherein the agitating element is configured to agitate a flow of a material in the first well or the channel; or a heating element arranged on a wall of the first well or the channel, wherein the heating element is configured to increase a temperature of a material in the first well or the channel.

Clause 10. The reference electrode of any of clauses 1-9, wherein the first well is configured to be in contact with a test sample provided to the electrochemical sensor.

Clause 11. The reference electrode of any of clauses 1-10, wherein an opening of the second well is covered by a cap, and the cap is over the substrate.

Clause 12. A reference electrode in an electrochemical sensor, the reference electrode comprising: a substrate including: a first inner wall defining a well in the substrate, the well extending from a first surface of the substrate towards a second surface of the substrate, wherein the first surface is opposite the second surface; an electrically conductive element arranged in the substrate and between the first surface and the second surface; and a second inner wall defining a channel arranged in the substrate and between the first surface and the second surface, wherein a first end of the channel is connected to the well, the electrically conductive element is exposed to a second end of the channel, and the first end is opposite the second end.

Clause 13. The reference electrode of clause 12, wherein a first end of the well is on the first surface, a second end of the well is between the first surface and the second surface, the first end of the channel is connected to the second end of the well, and the electrically conductive element is between the channel and the second surface.

Clause 14. The reference electrode of clause 12 or 13, wherein at least one of the well or the channel is configured to be at least partially filled with a reference conductive medium, and the electrically conductive element is configured to be in contact with the reference conductive medium.

Clause 15. The reference electrode of any of clauses 12-14, further comprising: an agitating element arranged on a wall of the well or the channel, wherein the agitating element is configured to agitate a flow of a material in the well or the channel.

Clause 16. The reference electrode of any of clauses 12-15, further comprising: a heating element arranged on a wall of the well or the channel, wherein the heating element is configured to increase a temperature of a material in the well or the channel.

Clause 17. An electrochemical sensor, comprising: one or more working electrodes in a substrate; and a reference electrode electrically coupled to the one or more working electrodes, the reference electrode comprising: a first inner wall defining a well in the substrate, the well extending from a first surface of the substrate towards a second surface of the substrate, wherein the first surface is opposite the second surface, an electrically conductive element arranged in the substrate and between the first surface and the second surface, and a second inner wall defining a channel arranged in the substrate and between the first surface and the second surface, wherein a first end of the channel is connected to the well, the electrically conductive element is exposed to a second end of the channel, and the first end is opposite the second end.

Clause 18. The electrochemical sensor of clause 17, wherein a working electrode of the one or more working electrodes includes a working well configured to be at least partially filled with an ion selective membrane, and the well is configured to be at least partially filled with a reference membrane that is different from the ion selective membrane.

Clause 19. The electrochemical sensor of clause 17 or 18, wherein the one or more working electrodes includes a first working electrode and a second working electrode, and the well is between the first working electrode and the second working electrode.

Clause 20. The electrochemical sensor of clause 19, wherein the channel extends in a direction that is not parallel to a direction along which the first working electrode and the second working electrode are arranged.

Clause 21. The electrochemical sensor of any of clauses 17-20, further comprising a counter electrode.

It may be to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It may be also imperative to note that all of the specifications, dimensions, and relationships outlined herein (e.g., the number of reference electrodes, channels, wells, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it may be intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. § 112 as it exists on the date of the filing hereof unless the words "means for" or "step for" are specifically used in the particular claims; and (b) does not intend, by any statement in the Specification, to limit this disclosure in any way that may be not otherwise reflected in the appended claims.

The invention claimed is:

1. A reference electrode in an electrochemical sensor, the reference electrode comprising:
 a substrate including:
  a first inner wall defining a first well in the substrate, the first well extending from a first surface of the substrate towards a second surface of the substrate, wherein the first surface is opposite the second surface;

a second inner wall defining a second well in the substrate, the second well extending from the first surface towards the second surface;
an electrically conductive element exposed to the second well; and
a third inner wall defining a channel arranged between the first surface and the second surface, wherein a first end of the channel is connected to the first well, a second end of the channel is connected to the second well, and the first end is opposite the second end; a fourth inner wall defining a third well in the substrate, the third well extending from the first surface towards the second surface;
an additional electrically conductive element arranged in the third well; and
a fifth inner wall defining an additional channel arranged between the first surface and the second surface, wherein a first end of the additional channel is connected to the first well, a second end of the additional channel is connected to the third well, and the first end of the additional channel is opposite the second end of the additional channel.

2. The reference electrode of claim 1, wherein a first end of the second well is on the first surface, a second end of the second well is between the first surface and the second surface, and the electrically conductive element is between the second end and the second surface.

3. The reference electrode of claim 1, wherein the electrically conductive element is configured to be in contact with a reference conductive medium, and the first well, the channel, or the second well are configured to be at least partially filled with the reference conductive medium.

4. The reference electrode of claim 3, wherein the reference conductive medium is a solid or semi-solid membrane, or a liquid.

5. The reference electrode of claim 1, further comprising:
 a valve coupled to the channel and configured to control flow of a conductive medium through the channel; and
 an additional valve coupled to the additional channel and configured to control flow of the conductive medium through the additional channel.

6. The reference electrode of claim 1, wherein the electrically conductive element is configured to be used for wireless communication, and the additional electrically conductive element is configured to be used for wire communication.

7. The reference electrode of claim 1, further comprising:
 an agitating element arranged on a wall of the first well or the channel, wherein the agitating element is configured to agitate a flow of a material in the first well or the channel; or
 a heating element arranged on a wall of the first well or the channel, wherein the heating element is configured to increase a temperature of a material in the first well or the channel.

8. The reference electrode of claim 1, wherein the first well is configured to be in contact with a test sample provided to the electrochemical sensor.

9. A reference electrode in an electrochemical sensor, the reference electrode comprising:
 a substrate including:
  a first inner wall defining a first well in the substrate, the first well extending from a first surface of the substrate towards a second surface of the substrate, wherein the first surface is opposite the second surface;

23 a second inner wall defining a second well in the substrate, the second well extending from the first surface towards the second surface;

an electrically conductive element exposed to the second well;

a third inner wall defining a channel arranged between the first surface and the second surface, wherein a first end of the channel is connected to the first well, a second end of the channel is connected to the second well, and the first end is opposite the second end; and a fourth inner wall defining an additional channel arranged between the first surface and the second surface, wherein a first end of the additional channel is connected to the first well, a second end of the additional channel is connected to the second well, and the first end of the additional channel is opposite the second end of the additional channel.

10. A reference electrode in an electrochemical sensor, the reference electrode comprising:

a substrate including:

a first inner wall defining a first well in the substrate, the first well extending from a first surface of the substrate toward a second surface of the substrate, wherein the first surface is opposite the second surface;

a second inner wall defining a second well in the substrate, the second well extending from the first surface toward the second surface;

an electrically conductive element exposed to the second well;

a third inner wall defining a channel arranged between the first surface and the second surface, wherein a first end of the channel is connected to the first well, a second end of the channel is connected to the second well, and the first end is opposite the second end, wherein an opening of the second well is covered by a cap, and the cap is over the substrate.

11. A reference electrode in an electrochemical sensor, the reference electrode comprising:

a substrate including:

a first inner wall defining a well in the substrate, the well extending from a first surface of the substrate towards a second surface of the substrate, wherein the first surface is opposite the second surface;

an electrically conductive element arranged in the substrate and between the first surface and the second surface;

a second inner wall defining a channel arranged in the substrate and between the first surface and the second surface, wherein a first end of the channel is connected to the well, the electrically conductive element is exposed to a second end of the channel, and the first end is opposite the second end; and one or both of: (i) an agitating element arranged on a wall of the well or the channel, wherein the agitating element is configured to agitate a flow of a material in the well or the channel, or (ii) a heating element arranged on a wall of the well or the channel, wherein the heating element is configured to increase a temperature of a material in the well or the channel.

12. The reference electrode of claim 11, wherein a first end of the well is on the first surface, a second end of the well is between the first surface and the second surface, the first end of the channel is connected to the second end of the well, and the electrically conductive element is between the channel and the second surface.

13. The reference electrode of claim 11, wherein at least one of the well or the channel is configured to be at least partially filled with a reference conductive medium, and the electrically conductive element is configured to be in contact with the reference conductive medium.

14. The reference electrode of claim 11, herein the reference electrode comprises the agitating element.

15. The reference electrode of claim 11, wherein the reference electrode comprises the heating element.

16. An electrochemical sensor, comprising:

one or more working electrodes in a substrate;

a counter electrode; and a reference electrode electrically coupled to the one or more working electrodes, the reference electrode comprising:

a first inner wall defining a first well in the substrate, the first well extending from a first surface of the substrate towards a second surface of the substrate, wherein the first surface is opposite the second surface, an electrically conductive element arranged in the substrate and between the first surface and the second surface, and a second inner wall defining a channel arranged in the substrate and between the first surface and the second surface, wherein a first end of the channel is connected to the first well, the electrically conductive element is exposed to a second end of the channel, and the first end is opposite the second end.

17. The electrochemical sensor of claim 16, wherein a working electrode of the one or more working electrodes includes a working well configured to be at least partially filled with an ion selective membrane, and the first well is configured to be at least partially filled with a reference membrane that is different from the ion selective membrane.

18. The electrochemical sensor of claim 16, wherein the one or more working electrodes includes a first working electrode and a second working electrode, and the first well is between the first working electrode and the second working electrode.

19. The electrochemical sensor of claim 18, wherein the channel extends in a direction that is not parallel to a direction along which the first working electrode and the second working electrode are arranged.

* * * * *